US012055871B2

(12) United States Patent
Soda

(10) Patent No.: US 12,055,871 B2
(45) **Date of Patent: *Aug. 6, 2024**

(54) TONER SUPPLY DEVICE AND IMAGE FORMING APPARATUS

(71) Applicant: KYOCERA Document Solutions Inc., Osaka (JP)

(72) Inventor: Tomohisa Soda, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,076

(22) Filed: Mar. 17, 2023

(65) Prior Publication Data

US 2023/0305433 A1 Sep. 28, 2023

(30) Foreign Application Priority Data

Mar. 25, 2022 (JP) ................................ 2022-049905

(51) Int. Cl.
*G03G 15/08* (2006.01)

(52) U.S. Cl.
CPC ..... *G03G 15/0862* (2013.01); *G03G 15/0865* (2013.01); *G03G 15/0879* (2013.01)

(58) Field of Classification Search
CPC ........... G03G 15/0862; G03G 15/0865; G03G 15/0879
See application file for complete search history.

(56) References Cited

U.S. PATENT DOCUMENTS

| | | | | |
|---|---|---|---|---|
| 2008/0253804 A1 | 10/2008 | Furuta et al. | 399/119 |
| 2009/0103952 A1* | 4/2009 | Sakamoto | G03G 15/0879 399/258 |
| 2010/0150613 A1 | 6/2010 | Furuta et al. | 399/258 |
| 2019/0187603 A1* | 6/2019 | Soda | G03G 15/0879 |
| 2019/0286041 A1* | 9/2019 | Soda | G03G 15/0121 |

FOREIGN PATENT DOCUMENTS

| | | |
|---|---|---|
| JP | 2009-20267 A | 1/2009 |
| JP | 2018066872 A * | 4/2018 |

* cited by examiner

*Primary Examiner* — Sophia S Chen
(74) *Attorney, Agent, or Firm* — Stein IP LLC

(57) ABSTRACT

A toner supply device includes a supply pipe, a first conveying pipe, a second conveying pipe, a first conveying member, a second conveying member, and a loosening member. The loosening member is arranged in the supply pipe reciprocatably in the extending direction of the supply pipe. The first and second conveying pipes are arranged side by side in a direction intersecting their extending directions so as to join together at a confluence portion to which the supply pipe is connected. The loosening member is coupled with each of the first and second conveying members at the confluence portion and extends inward of the supply pipe.

5 Claims, 13 Drawing Sheets

TONER SUPPLY DEVICE AND IMAGE FORMING APPARATUS

INCORPORATION BY REFERENCE

This application is based upon and claims the benefit of priority from the corresponding Japanese Patent Application No. 2022-049905 filed on Mar. 25, 2022, the entire contents of which are hereby incorporated by reference.

BACKGROUND

The present disclosure relates to a toner supply device and an image forming apparatus.

As image forming apparatuses of an electrophotographic type such as copiers and printers, a wide use is made of apparatuses that develop, using toner, an electrostatic latent image formed on the surface of a photosensitive drum as an image carrying member to form a toner image that is then transferred to a sheet. In connection with supply of toner to a developing device, there has been proposed a technique to suppress attachment and agglomeration of toner to and on the inner wall of a toner conveying pipe.

SUMMARY

According to one aspect of what is disclosed herein, a toner supply device for supplying toner in first and second containers to a developing device includes a supply pipe, a first conveying pipe, a second conveying pipe, a first conveying member, a second conveying member, and a loosening member. The first conveying pipe is a single pipe and is connected to the developing device, and via it the toner flows into the developing device. The first conveying pipe is connected between the first container and the supply pipe and through it the toner is conveyed from the first container toward the supply pipe. The second conveying pipe is connected between the second container and the supply pipe and through it the toner is conveyed from the second container toward the supply pipe. The first conveying member is rotatably arranged in the first conveying pipe and conveys the toner from the first container toward the supply pipe. The second conveying member is rotatably arranged in the second conveying pipe and conveys the toner from the second container toward the supply pipe. The loosening member is arranged in the supply pipe reciprocatably in the its extending direction. The first and second conveying pipes are arranged side by side in a direction intersecting their extending directions so as to join together at a confluence portion to which the supply pipe is connected. The loosening member is coupled with each of the first and second conveying members at the confluence portion and extends inward of the supply pipe.

DETAILED DESCRIPTION

Embodiments of the present disclosure will be described below with reference to the accompanying drawings. The present disclosure is, however, not limited to what is specifically described below.

Figure 1:
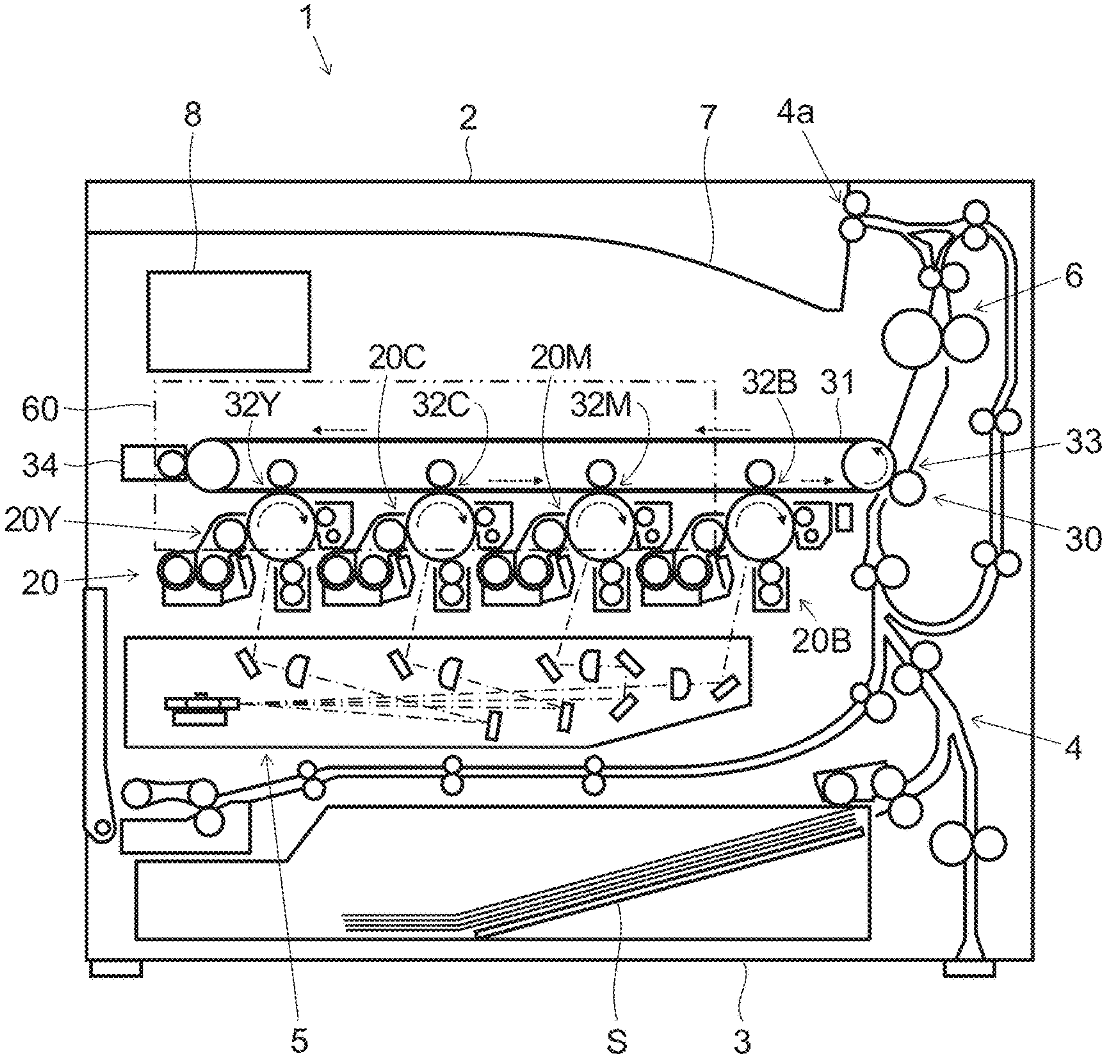
FIG. 1 is a schematic sectional view of an image forming apparatus according to one embodiment of the present disclosure.
Figure 2:
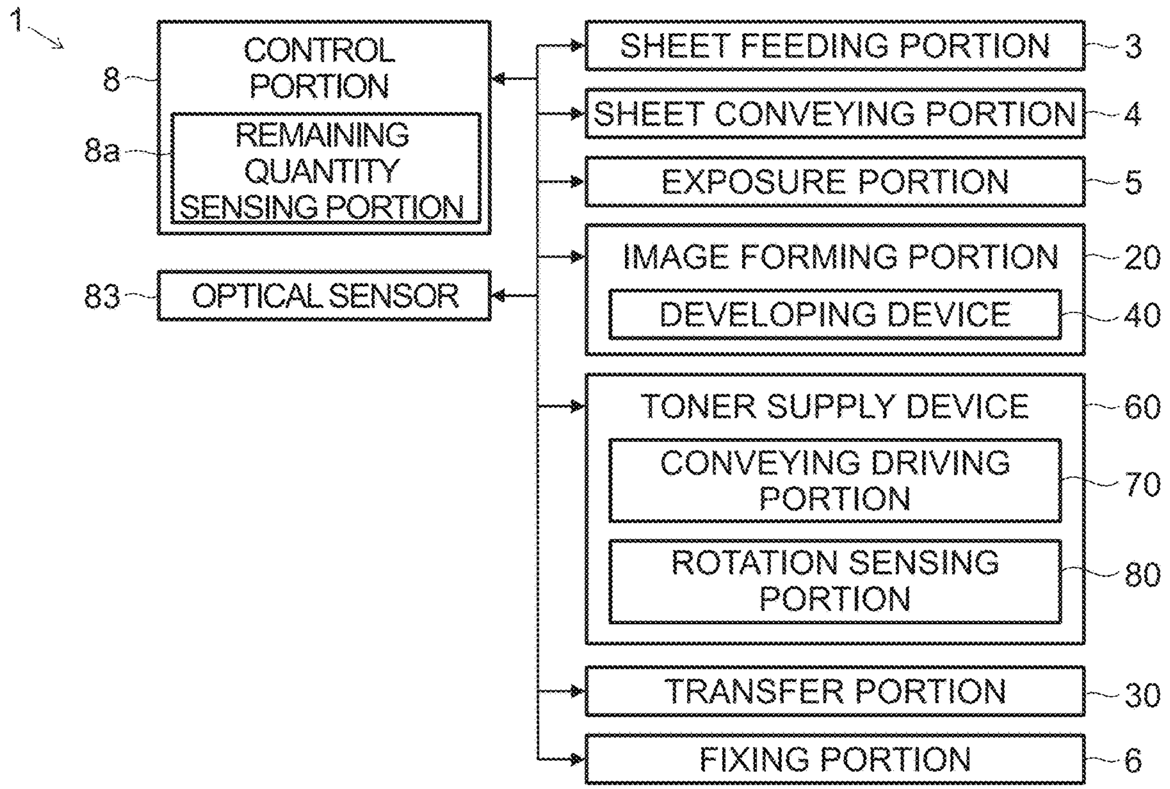
FIG. 2 is a block diagram showing an outline of the construction of the image forming apparatus in FIG. 1.
Figure 3:
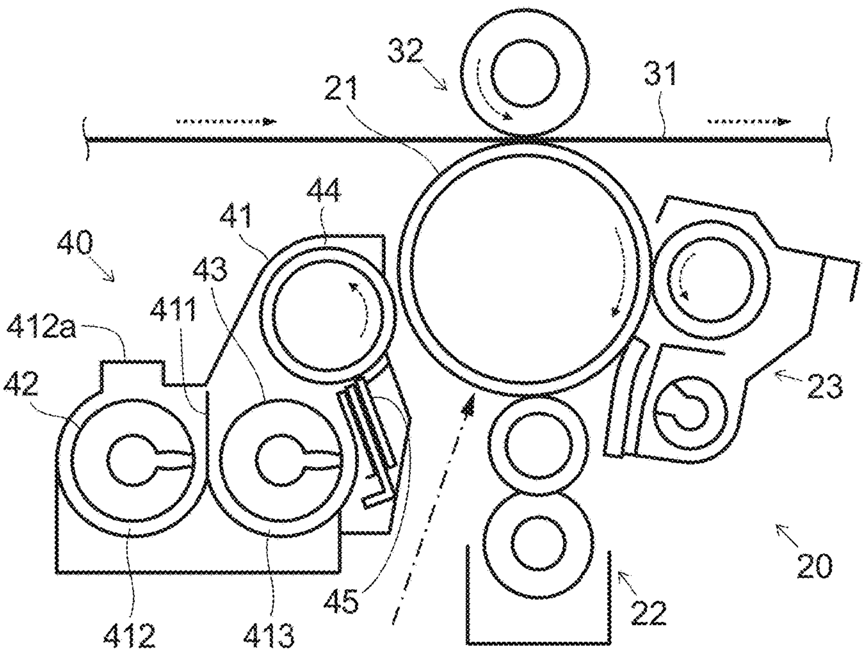
FIG. 3 is a sectional view of and around an image forming portion in the image forming apparatus in FIG. 1.

FIG. 1 is a schematic sectional view of an image forming apparatus 1 according to an embodiment. FIG. 2 is a block diagram showing an outline of the construction of the image forming apparatus 1 in FIG. 1. FIG. 3 is a sectional view of and around an image forming portion 20 in the image forming apparatus 1 in FIG. 1. One example of the image forming apparatus 1 according to the embodiment is a color printer of a tandem-type which transfers a toner image onto a sheet S using the intermediate transfer belt 31. The image forming apparatus 1 may be what is called a multifunction peripheral provided with the functions of, for example, printing, scanning (image reading), and facsimile transmission.

As shown in FIGS. 1, 2, and 3, the image forming apparatus 1 includes, in its main body 2, a sheet feeding portion 3, a sheet conveying portion 4, an exposure portion 5, an image forming portion 20, a transfer portion 30, a fixing portion 6, a sheet discharge portion 7, and a control portion 8.

The sheet feeding portion 3 is arranged in a bottom part of the main body 2. The sheet feeding portion 3 stores a plurality of sheets S before being printed and, during printing, feeds them out one after another separately. The sheet conveying portion 4 extends in the up-down direction along a side wall of the main body 2. The sheet conveying portion 4 conveys a sheet S fed out from the sheet feeding portion 3 to a secondary transfer portion 33 and then to the fixing portion 6, and then discharges the sheet S after fixing through a sheet discharge port 4*a* to the sheet discharge portion 7. The exposure portion 5 is arranged above the sheet feeding portion 3. The exposure portion 5 shines laser light controlled based on image data toward the image forming portion 20.

The image forming portion 20 is arranged above the exposure portion 5 but under the intermediate transfer belt 31. The image forming portion 20 includes an image forming portion for yellow 20Y, an image forming portion for cyan 20C, an image forming portion for magenta 20M, and an image forming portion for black 20B. These four image forming portions 20 have basically similar structures. Thus, in the following description, the suffixes “Y”, “C”, “M”, and “B” distinguishing different colors are often omitted, unless distinction is needed.

The image forming portion 20 includes a photosensitive drum (image carrying member) 21 which is supported so as to be rotatable in a predetermined direction (the clockwise direction in FIGS. 1 and 3). The image forming portion 20 further includes, arranged around the photosensitive drum 21 along its rotation direction, a charging portion 22, a developing device 40, and a drum cleaning portion 23. A primary transfer portion 32 is arranged between the developing device 40 and the drum cleaning portion 23.

The photosensitive drum 21 has a photosensitive layer around its outer circumferential face. The charging portion 22 electrostatically charges the outer circumferential face of the photosensitive drum 21 to a predetermined potential. The exposure portion 5 exposes to light the outer circumferential face of the photosensitive drum 21 electrostatically charged by the charging portion 22 to form on it an electrostatic latent image of the document image. The developing device 40 develops the electrostatic latent image by feeding it with toner to form a toner image. The four image forming portions 20 form toner images of different colors respectively. After the toner image is primarily transferred to the outer circumferential face of the intermediate transfer belt 31, the drum cleaning portion 23 performs cleaning by removing toner and the like left on the outer circumferential face of the photosensitive drum 21. In this way, the image forming portion 20 forms an image (toner image) to be later transferred to a sheet S.

The transfer portion 30 includes an intermediate transfer belt 31, primary transfer portions 32Y, 32C, 32M, and 32B, a secondary transfer portion 33, and a belt cleaning portion 34. The intermediate transfer belt 31 is arranged over the four image forming portions 20. The intermediate transfer belt 31 is an endless intermediate transfer member which is supported so as to be rotatable in a predetermined direction (counter-clockwise in FIG. 1) and to which the toner images formed on the four image forming portions 20 are sequentially superposed on each other and thereby primarily transferred. The four image forming portions 20 are arranged in what is called a tandem formation in which they are arranged in a row from upstream to downstream in the rotation direction of the intermediate transfer belt 31.

The primary transfer portions 32Y, 32C, 32M, and 32B are arranged across the intermediate transfer belt 31 over the image forming portions 20Y, 20C, 20M, and 20B for different colors. The secondary transfer portion 33 is arranged upstream of the fixing portion 6 in the sheet conveying direction in the sheet conveying portion 4 and downstream of the four image forming portions 20Y, 20C, 20M, and 20B in the rotation direction of the intermediate transfer belt 31. The belt cleaning portion 34 is arranged downstream of the secondary transfer portion 33 in the rotation direction of the intermediate transfer belt 31.

The primary transfer portions 32 transfer the toner images formed on the outer circumferential face of the photosensitive drums 21 to the intermediate transfer belt 31. In other words, a toner image is primarily transferred to the outer circumferential face of the intermediate transfer belt 31 in the primary transfer portions for different colors 32Y, 32C, 32M, and 32B. Then, as the intermediate transfer belt 31 rotates, the toner images on the four image forming portions 20 are sequentially superposed on each other and are thereby transferred to the intermediate transfer belt 31 with predetermined timing. In this way, a color toner image with the toner images of four colors, namely yellow, cyan, magenta, and black, superposed together is formed on the outer circumferential face of the intermediate transfer belt 31.

The color toner image on the outer circumferential face of the intermediate transfer belt 31 is transferred to a sheet S conveyed in synchronism by the sheet conveying portion 4 at the secondary transfer nip formed in the secondary transfer portion 33. The belt cleaning portion 34, after secondary transfer, performs cleaning by removing deposits such as toner left on the outer circumferential face of the intermediate transfer belt 31. In this way, the transfer portion 30 transfers (records) toner images formed on the outer circumferential face of the photosensitive drums 21 to a sheet S.

The fixing portion 6 is arranged above the secondary transfer portion 33. The fixing portion 6 heats and presses the sheet S having the toner image transferred to it to fix the toner image to the sheet S.

The sheet discharge portion 7 is arranged above the transfer portion 30. The sheet S having the toner images fixed to it and thus having undergone printing is conveyed to the sheet discharge portion 7. In the sheet discharge portion 7, the sheet having undergone printing (the print result) is picked up from above.

The control portion 8 includes a CPU, an image processing portion, a storage portion, and other electronic circuits and components (none of which are illustrated). The CPU, based on control programs and data stored in the storage portion, controls the operation of different components provided in the image forming apparatus 1 to perform processing related to the functions of the image forming apparatus 1. The sheet feeding portion 3, the sheet conveying portion 4, the exposure portion 5, the image forming portion 20, the transfer portion 30, and the fixing portion 6 individually receive commands from the control portion 8 and coordinate to perform printing on the sheet S. The storage portion is composed of a combination of, for example, a non-volatile storage device such as a program ROM (read-only memory) and a data ROM and a volatile storage device such as a RAM (random-access memory).

Next, the construction of and around the developing device 40 will be described with reference to FIG. 3. The developing devices 40 for different colors have basically a similar structure; thus, for their components, the suffixes distinguishing different colors will be omitted and no overlapping description will be repeated.

The developing device 40 feeds toner to the outer circumferential face of the photosensitive drum 21. The developing device 40 includes a developer container 41, a first stirring/conveying member 42, a second stirring/conveying member 43, a developing roller 44, and a regulating member 45.

The developer container 41 is in an elongate shape extending in the axial direction of the photosensitive drum 21 (in the depth direction with respect to the plane of FIG. 3), and is arranged with its longitudinal direction aligned horizontally. The developer container 41 stores, as developer, for example, magnetic one-component developer containing magnetic toner. Developer may instead be, for example, non-magnetic one-component developer or two-component developer containing toner and magnetic carrier. The developer container 41 includes a partition portion 411, a first conveying chamber 412, and a second conveying chamber 413.

The partition portion 411 is provided in a lower part inside the developer container 41. The partition portion 411 is provided in the lower part of the developer container 41, substantially in a middle part of it in a direction (the left-right direction in FIG. 3) intersecting the axial direction, and extends in the axial and up-down directions. The partition portion 411 divides the inside of the developer container 41 in the direction (the left-right direction in FIG. 3) intersecting the axial direction. The developer container 41 has, in each of the opposite ends of the partition portion 411 in the axial direction (the depth direction with respect to the plane of FIG. 3), a communication portion (not shown) between the first and second conveying chambers 412 and 413.

The first and second conveying chambers 412 and 413 are provided inside the developer container 41. The first and second conveying chambers 412 and 413 are formed by partitioning the inside of the developer container 41 with the partition portion 411 and are arranged side by side. The second conveying chamber 413 is arranged inside the developer container 41, adjacently below the region in which the developing roller 44 is arranged. The first conveying chamber 412 is arranged inside the developer container 41, in a region farther away from the developing roller 44 than the second conveying chamber 413. The first conveying chamber 412 is supplied with toner via a supply pipe connecting portion 412*a* shown in FIG. 3.

The first stirring/conveying member 42 is arranged inside the first conveying chamber 412. The second stirring/conveying member 43 is arranged inside the second conveying chamber 413. The second stirring/conveying member 43 is located close to the developing roller 44 and extends parallel to it. The first and second stirring/conveying members 42 and 43 are supported on the developer container 41 so as to be rotatable about axes that extend parallel to the photosensitive drum 21. The first and second stirring/conveying members 42 and 43, by rotating about their axes, stir and convey developer in opposite directions along the axial direction of their rotation.

As the first and second stirring/conveying members 42 and 43 rotate, developer circulates between the first and second conveying chambers 412 and 413 via the communication portions arranged in the opposite end parts of the partition portion 411 in the axial direction. In the first and second conveying chambers 412 and 413, toner fed from outside is stirred and electrostatically charged.

The developing roller 44 is arranged inside the developer container 41, above the second stirring/conveying member 43. The developing roller 44 is supported on the developer container 41 so as to be rotatable about an axis that extends parallel to the axis of the photosensitive drum 21. The developing roller 44 includes, for example, a cylindrical developing sleeve that rotates counter-clockwise in FIG. 3 and a developing roller-side magnetic pole that is fixed inside the developing sleeve (neither is shown).

Part of the outer circumferential face of the developing roller 44 is exposed out of the developer container 41 so as to face the photosensitive drum 21 in proximity to it. In a region opposite the photosensitive drum 21, the developing roller 44 holds on its outer circumferential face the toner to be fed to the outer circumferential face of the photosensitive drum 21. The developing roller 44 attaches the toner in the second conveying chamber 413 to the electrostatic latent image on the outer circumferential face of the photosensitive drum 21 to form a toner image.

The regulating member 45 is arranged in a region where the developing roller 44 and the photosensitive drum 21 face each other, upstream of the developing roller 44 in its rotation direction. The regulating member 45 is arranged opposite the developing roller 44 in proximity to it with a predetermined distance left between its tip end and the outer circumferential face of the developing roller 44. The regulating member 45 is arranged opposite the developing roller 44 in proximity to it while keeping a predetermined distance between its tip end and the outer circumferential face of the developing roller 44. The regulating member 45 extends over the entire region of the developing roller 44 in the axial direction (the depth direction with respect to the plane of FIG. 3). The regulating member 45 regulates the layer thickness of developer (toner) held on the outer circumferential face of the developing roller 44.

The toner in the developer container 41 is stirred, circulated, and electrostatically charged in the first and second stirring/conveying members 42 and 43, and is then passed to the outer circumferential face of the developing roller 44 by the second stirring/conveying member 43. Having its layer thickness regulated by the regulating member 45, the toner, as the developing roller 44 rotates, is conveyed to the region where the developing roller 44 and the photosensitive drum 21 face each other. When a predetermined developing voltage is applied to the developing roller 44, due to the potential difference from that on the outer circumferential face of the photosensitive drum 21, the toner held on the outer circumferential face of the developing roller 44 flies through the developing space toward the outer circumferential face of the photosensitive drum 21, thereby the electrostatic latent image on the outer circumferential face of the photosensitive drum 21 is developed.

Figure 4:
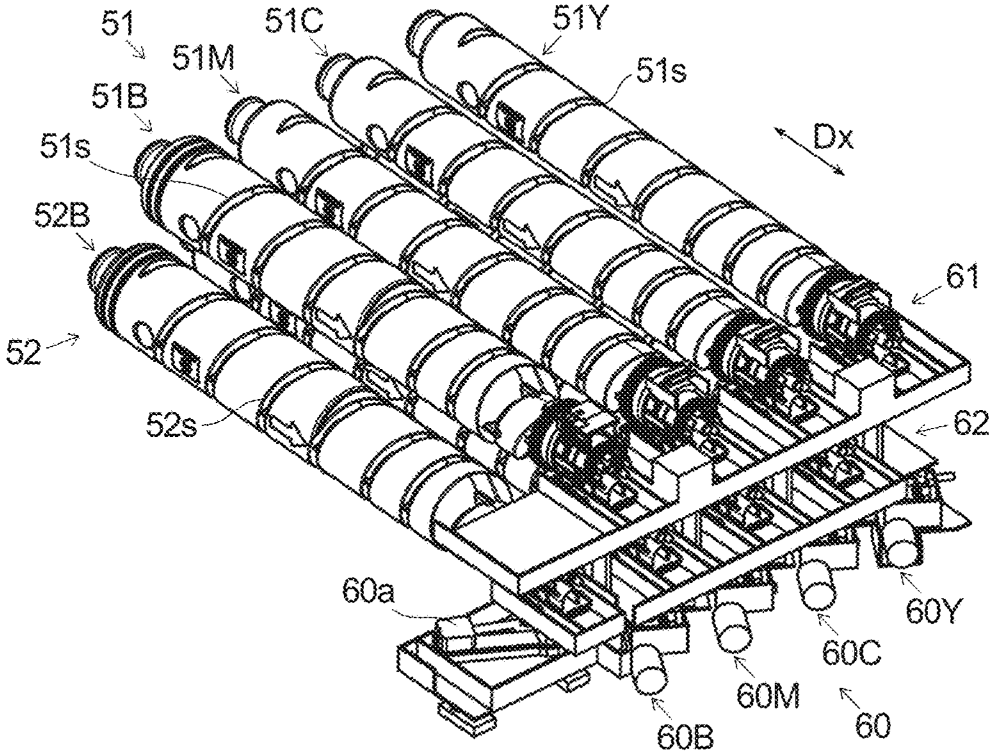
FIG. 4 is a perspective view of and around a toner supply device in the image forming apparatus in FIG. 1.

In connection with the supply of toner to the developing device 40, the image forming apparatus 1 includes a first container 51, a second container 52, and a toner supply device 60 (see FIG. 4). The first and second containers 51 and 52 and the toner supply device 60 are arranged above the developing device 40. The first and second containers 51 and 52 and the toner supply device 60 are provided one of each for each of four colors of yellow, cyan, magenta, and black.

Figure 5:
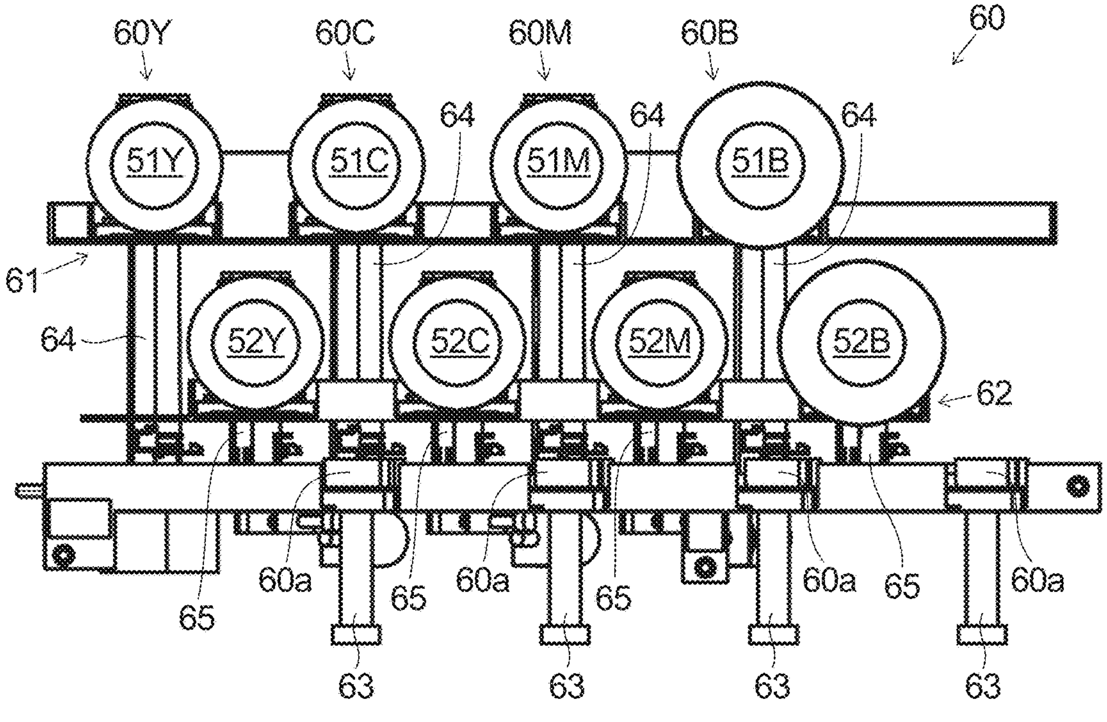
FIG. 5 is a front view of and around the toner supply device in FIG. 4.
Figure 6:
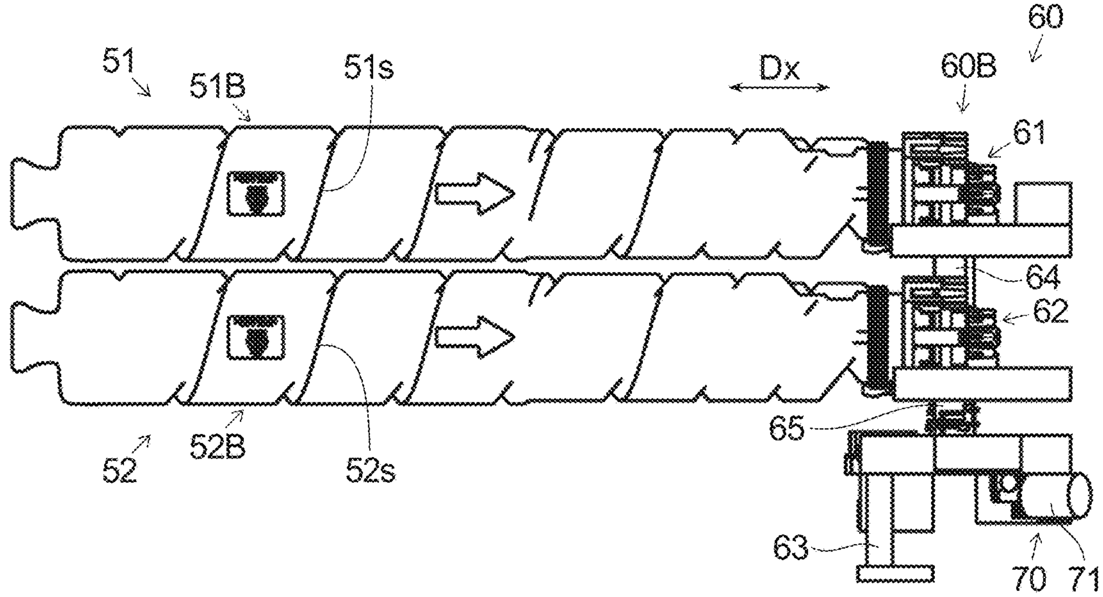
FIG. 6 is a side view of and around the toner supply device in FIG. 4.
Figure 7:
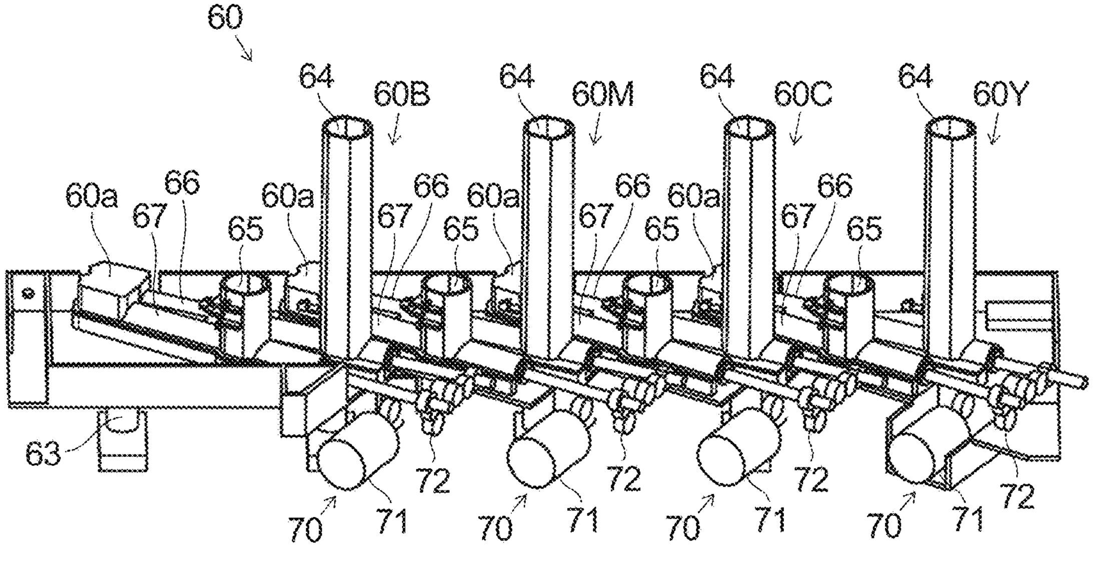
FIG. 7 is a perspective view of the toner supply device in FIG. 4.
Figure 8:
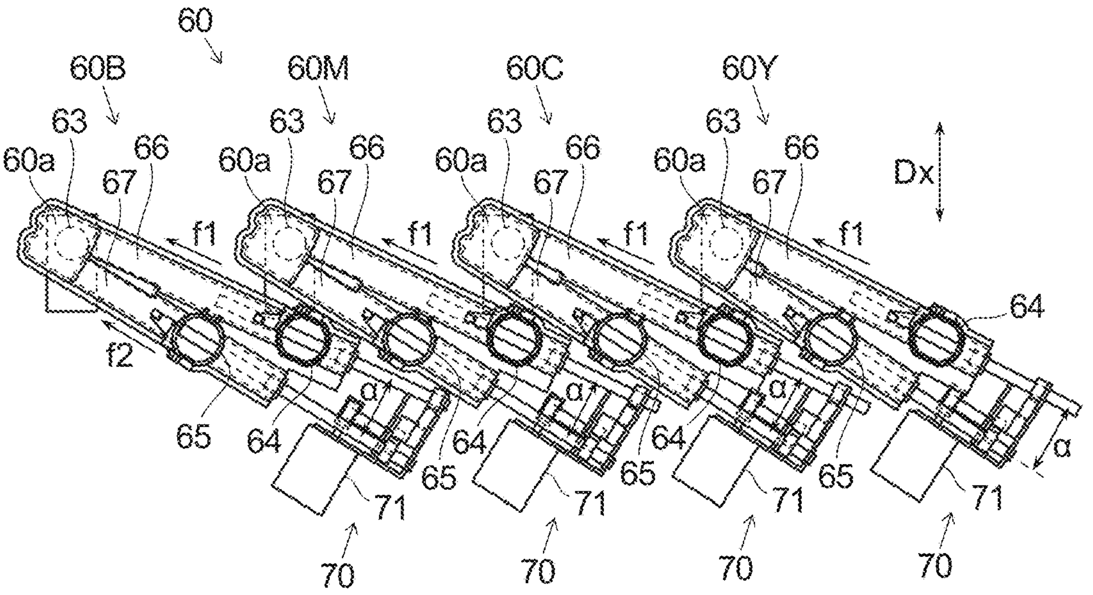
FIG. 8 is a plan view of the toner supply device in FIG. 4.
Figure 9:
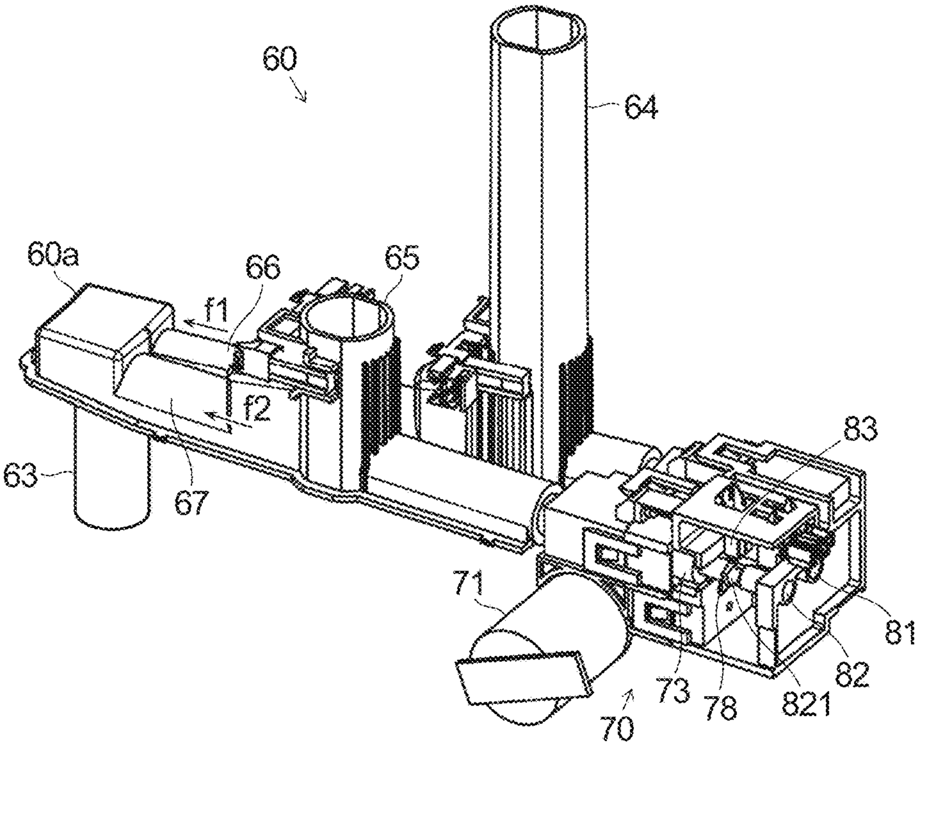
FIG. 9 is a perspective view of first and second conveying members in the toner supply device in FIG. 7.
Figure 10:
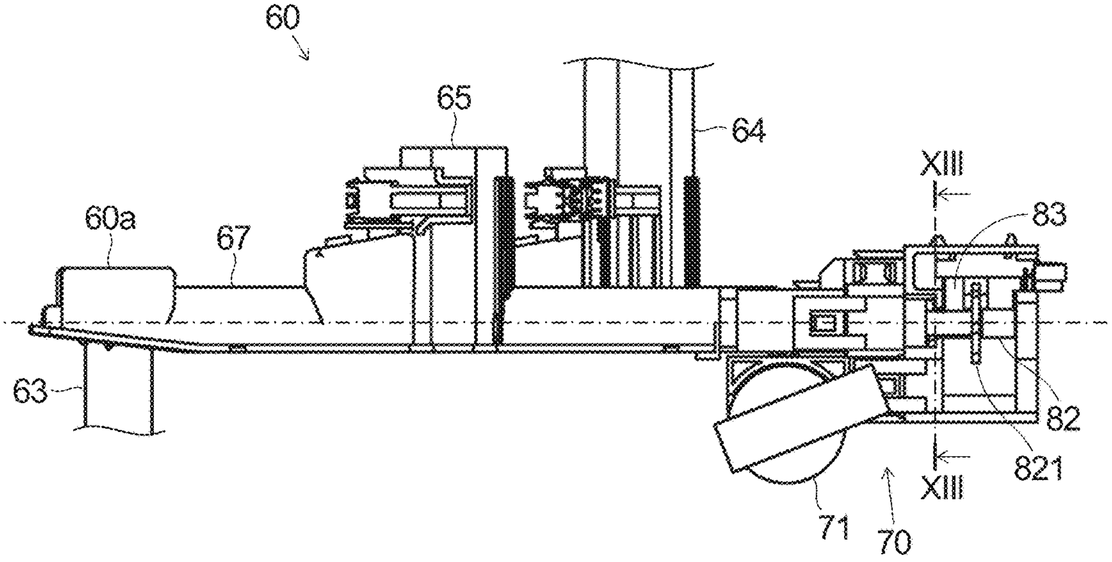
FIG. 10 is a perspective view of the first and second conveying members in the toner supply device in FIG. 7.
Figure 11:
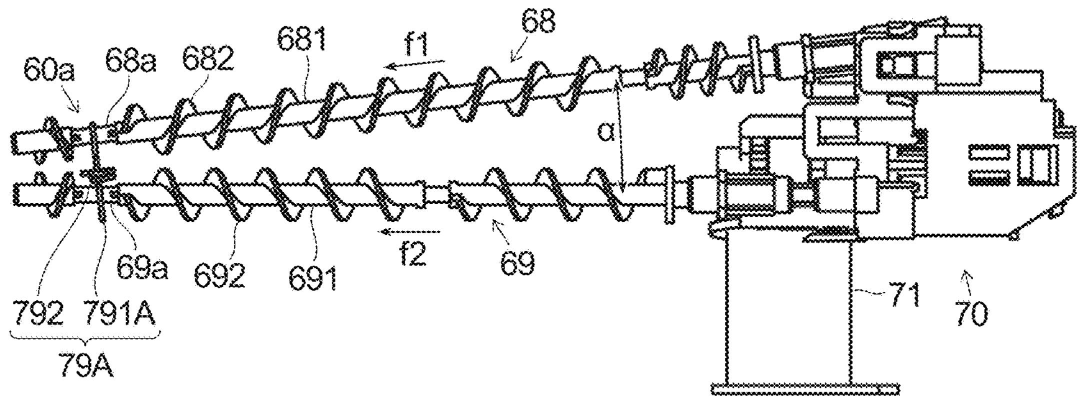
FIG. 11 is a plan view of the first and second conveying members in the toner supply device in FIG. 9.
Figure 12:
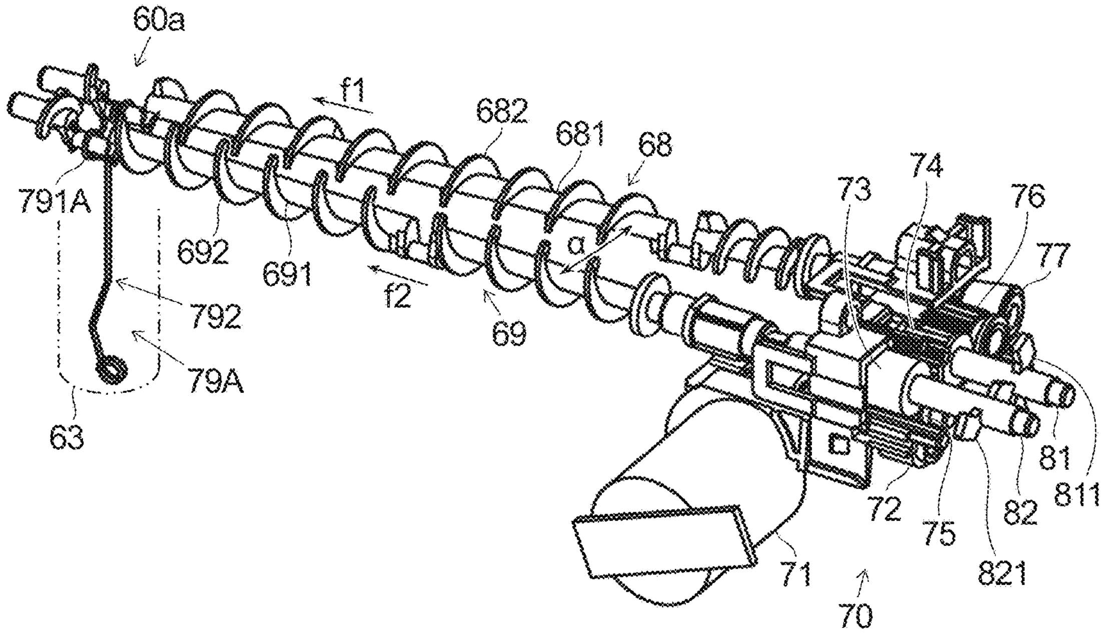
FIG. 12 is a perspective view of the first and second conveying members in the toner supply device in FIG. 9.
Figure 13:
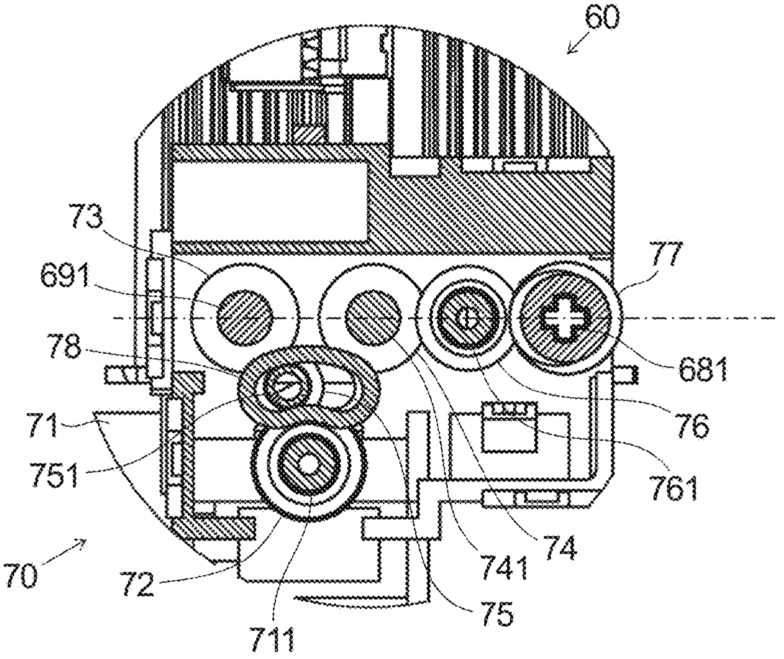
FIG. 13 is a sectional back view of and around a conveying driving portion in the toner supply device in FIG. 10.

Next, the construction of and around the toner supply device 60 of the first embodiment will be described with reference to FIGS. 4 to 13. FIG. 4 is a perspective view of and around the toner supply device 60 in the image forming apparatus 1 in FIG. 1. FIGS. 5 and 6 are a front view and a side view, respectively, of and around the toner supply device 60 in FIG. 4. FIGS. 7 and 8 are a perspective view and a plan view, respectively, of and around the toner supply device 60 in FIG. 4. FIGS. 9 and 10 are a perspective view and a side view, respectively, of a first conveying pipe 66 and a second conveying pipe 67 in the toner supply device 60 in FIG. 7. FIGS. 11 and 12 are a plan view and a perspective view, respectively, of a first conveying member 68 and a second conveying member 69 in the toner supply device 60 in FIG. 9. FIG. 13 is a sectional back view of and around a conveying driving portion 70 in the toner supply device 60 in FIG. 10.

The first container 51, the second container 52, and the toner supply device 60 include the following: a first and a second container 51Y and 52Y and a toner supply device 60Y for yellow; a first and a second container 51C and 52C and a toner supply device 60C for cyan; a first and a second container 51M and 52M and a toner supply device 60M for magenta; and a first and a second container 51B and 52B and a toner supply device 60B for black. The first and second containers 51 and 52 and the toner supply device 60 for different colors have basically a similar structure. Thus, in the following description, the suffixes "Y", "C", "M", and "B" distinguishing different colors are often omitted, unless distinction is needed.

The first container 51 is arranged above the second container 52. The second container 52 is arranged below the first container 51. The first and second containers 51 and 52 are arranged, as seen from in front, deviated from each other in the array direction of the image forming portions 20 and the toner supply devices 60. The first and second containers 51 and 52 are removable from the main body 2 and stores toner to be supplied to the developing device 40.

The first and second containers 51 and 52 are in an elongate cylindrical shape extending in the axial direction Dx of the photosensitive drum 21, and are arranged with their longitudinal direction aligned horizontally. Formed on the circumference wall of the first and second containers 51 and 52 are helical projecting portions 51*s* and 52*s* that project inward in the radial direction and that extend in the longitudinal direction.

The first and second containers 51 and 52 are each closed at one end (front side) in the axial direction Dx and each have an opening (not shown) at the other end (rear side) in the axial direction Dx. The first and second containers 51 and 52 are, at the rear side, i.e., open side, respectively connected to a first container connecting portion 61 and a second container connecting portion 62 in the toner supply device 60. The first and second containers 51 and 52 are supported on the toner supply device 60 so as to be rotatable about their axes that extend parallel to the axial direction Dx of the photosensitive drum 21.

The first and second containers 51 and 52 are rotated by a driver (not shown) about their axes that extend parallel to the axial direction Dx of the photosensitive drum 21. As the first and second containers 51 and 52 rotate, the toner inside is conveyed by the helical projecting portions 51*s* and 52*s* toward the rear side i.e., open side. Thus, the toner in the first and second containers 51 and 52 flows into the toner supply device 60 through the opening.

The toner supply device 60 is arranged at the rear side of the first and second containers 51 and 52. The four toner supply devices 60 are arranged in a row in the same order as the four image forming portions 20. The toner supply device 60 supplies the toner in the first and second containers 51 and 52 to the developing device 40.

The toner supply device 60 includes the first and second container connecting portions 61 and 62, a supply pipe 63, a first and a second vertical pipe 64 and 65, the first and second conveying pipes 66 and 67, the first and second conveying members 68 and 69, the conveying driving portion 70, a loosening member 79A, and a rotation sensing portion 80.

The first container connecting portion 61 is arranged in an upper part of the toner supply device 60, above the second container connecting portion 62. The first container connecting portion 61 has a toner circulation path (not shown) inside. The first container connecting portion 61 is connected to the first container 51 at its open side and rotatably supports the first container 51. The downstream end of the first container connecting portion 61 in the toner circulation direction is connected to the first vertical pipe 64. When the toner in the first container 51 is supplied to the developing device 40, the toner flows from the first container 51 into the first container connecting portion 61 and then flows through and then out of the first container connecting portion 61 toward the first vertical pipe 64.

The second container connecting portion 62 is arranged in an upper part of the toner supply device 60, below the first container connecting portion 61. The second container connecting portion 62 has a toner circulation path (not shown) inside. The second container connecting portion 62 is connected to the second container 52 at its open side and rotatably supports the second container 52. The downstream end of the second container connecting portion 62 in the toner circulation direction is connected to the second vertical pipe 65. When the toner in the second container 52 is supplied to the developing device 40, the toner flows from the second container 52 into the second container connecting portion 62 and then flows through and then out of the second container connecting portion 62 toward the second vertical pipe 65.

The supply pipe 63 is arranged in a lower part of the toner supply device 60. The toner supply device 60 includes the single supply pipe 63. The supply pipe 63 is formed in a cylindrical shape extending in the up-down direction. The top end of the supply pipe 63 is connected to a confluence portion 60*a* where the first and second conveying pipes 66 and 67 join together. The bottom end of the supply pipe 63 is connected to the supply pipe connecting portion 412*a* in the developing device 40. When the toner in the first and second containers 51 and 52 is supplied to the developing device 40, the toner flows via the confluence portion 60*a* into the supply pipe 63 and then flows through the supply pipe 63 into the developing device 40.

The first vertical pipe 64 is arranged between the first container connecting portion 61 and the first conveying pipe 66. The first vertical pipe 64 is formed in a cylindrical shape extending in the up-down direction. The top end of the first vertical pipe 64 is connected to the first container connecting portion 61. The bottom end of the first vertical pipe 64 is connected to the first conveying pipe 66. When the toner in the first container 51 is supplied to the developing device 40, the toner flows via the first container connecting portion 61 into the first vertical pipe 64 and then flows through and then out of the first vertical pipe 64 toward the first conveying pipe 66.

The second vertical pipe 65 is arranged between the second container connecting portion 62 and the second conveying pipe 67. The second vertical pipe 65 is formed in a cylindrical shape extending in the up-down direction. The top end of the second vertical pipe 65 is connected to the second container connecting portion 62. The bottom end of the second vertical pipe 65 is connected to the second conveying pipe 67. When the toner in the second container 52 is supplied to the developing device 40, the toner flows via the second container connecting portion 62 into the second vertical pipe 65 and then flows through and then out of the second vertical pipe 65 toward the second conveying pipe 67.

Since the first container 51 and the first container connecting portion 61 are arranged above the second container

52 and the second container connecting portion 62, the first vertical pipe 64 is longer in the up-down direction than the second vertical pipe 65. Since the second container 52 and the second container connecting portion 62 are arranged below the first container 51 and the first container connecting portion 61, the second vertical pipe 65 is shorter in the up-down direction than the first vertical pipe 64. The first and second vertical pipes 64 and 65 are arranged at the same position in the axial direction Dx of the photosensitive drum 21. In other words, the first and second vertical pipes 64 and 65 are arranged side by side along a straight line perpendicular to the axial direction Dx.

The first conveying pipe 66 is arranged between the first vertical pipe 64 and the supply pipe 63 in the up-down direction. The first conveying pipe 66 is formed in a cylindrical shape extending in the horizontal direction. To one end of the first conveying pipe 66 in its extending direction, the first vertical pipe 64 is connected. To the other end of the first conveying pipe 66 in its extending direction, the confluence portion 60*a* is connected. When the toner in the first container 51 is supplied to the developing device 40, the toner flows from the first vertical pipe 64 into the first conveying pipe 66 and then flows through and then out of the first conveying pipe 66 toward the confluence portion 60*a*. In other words, the first conveying pipe 66 is connected between the first container 51 and the supply pipe 63, and the toner is conveyed from the first container 51 toward the supply pipe 63.

The second conveying pipe 67 is arranged between the second vertical pipe 65 and the supply pipe 63 in the up-down direction. The second conveying pipe 67 is formed in a cylindrical shape extending in the horizontal direction. To one end of the second conveying pipe 67 in its extending direction, the second vertical pipe 65 is connected. The other end of the second conveying pipe 67 in its extending direction is connected to the confluence portion 60*a*. When the toner in the second container 52 is supplied to the developing device 40, the toner flows from the second vertical pipe 65 into the second conveying pipe 67 and then flows through and then out of the second conveying pipe 67 toward the confluence portion 60*a*. In other words, the second conveying pipe 67 is connected between the second container 52 and the supply pipe 63, and the toner is conveyed from the second container 52 toward the supply pipe 63.

The first and second conveying pipes 66 and 67 are arranged side by side in a direction (horizontal direction) intersecting their extending directions so as to join together at the confluence portion 60*a* to which the supply pipe 63 is connected. In other words, the first and second conveying pipes 66 and 67 are arranged so that their respective extension lines intersect each other at their confluence portion 60*a* sides with respect to their extending directions. The first and second conveying pipes 66 and 67 are arranged such that the angle between their extending directions is an acute angle in the horizontal direction, that is, in a V-shape as seen from the up-down direction.

The first conveying member 68 is arranged inside the first conveying pipe 66. The first conveying member 68 includes a rotary shaft 681 that is provided between opposite ends of the cylindrical first conveying pipe 66 in the axial direction and a first conveying blade 682 that is formed on the outer circumferential face of the rotary shaft 681 and extends in a helical shape along the axial direction. The first conveying member 68 is supported inside the first conveying pipe 66 so as to be rotatable about an axis that extends in the horizontal direction. One end part of the first conveying member 68 in the axial direction is located in the confluence portion 60*a*.

The first conveying member 68, as it rotates about the axis, stirs and conveys the toner in the first conveying pipe 66 along the toner conveying direction f1 (see FIGS. 8, 9, 11, and 12) that is parallel to the rotation axis. The first conveying member 68 conveys the toner in the first conveying pipe 66 from the first vertical pipe 64 toward the confluence portion 60*a*. In other words, the first conveying member 68 conveys the toner from the first container 51 toward the supply pipe 63.

The second conveying member 69 is arranged inside the second conveying pipe 67. The second conveying member 69 includes a rotary shaft 691 that is provided between opposite ends of the cylindrical second conveying pipe 67 in the axial direction and a second conveying blade 692 that is formed on the outer circumferential face of the rotary shaft 691 and extends in a helical shape along the axial direction. The second conveying member 69 is supported inside the second conveying pipe 67 so as to be rotatable about the axis that extends in the horizontal direction. One end part of the second conveying member 69 in the axial direction is located in the confluence portion 60*a*.

The second conveying member 69, as it rotates about the axis, stirs and conveys the toner in the second conveying pipe 67 along the toner conveying direction f2 (see FIGS. 8, 9, 11, and 12) that is parallel to the rotation axis. The second conveying member 69 conveys the toner in the second conveying pipe 67 from the second vertical pipe 65 toward the confluence portion 60*a*. In other words, the second conveying member 69 conveys the toner from the second container 52 toward the supply pipe 63.

The first and second conveying pipes 66 and 67 are, as mentioned above, arranged in a V-shape as seen from the up-down direction. That is, the rotary shaft 681 of the first conveying member 68 and the rotary shaft 691 of the second conveying member 69 are arranged so as to form a predetermined axial angle $\alpha$.

The conveying driving portion 70 is arranged in a rear part of the toner supply device 60, upstream of the first and second conveying pipes 66 and 67 in the toner conveying direction. The conveying driving portion 70 includes a motor 71, a first gear 72, a second gear 73, a third gear 74, a swing gear 75, an idle gear 76, and a fourth gear 77.

The motor 71 generates a driving force for rotating the first and second conveying members 68 and 69. The motor 71 is controlled by the control portion 8. To the motor 71, an output shaft 711 is coupled. The output shaft 711 is arranged below the second conveying member 69 and extends parallel to the rotary shaft 691 of the second conveying member 69.

The first gear 72 is fixed to the output shaft 711 of the motor 71. The first gear 72 is located below the second gear 73, the third gear 74, and the swing gear 75. The first gear 72 is rotated by the motor 71. The first gear 72 meshes with the swing gear 75 to transmit the driving force of the motor 71 to the swing gear 75.

The second gear 73 is located above the swing gear 75. The second gear 73 is fixed coaxially with the rotary shaft 691 of the second conveying member 69. The second gear 73 receives the driving force of the motor 71 from the swing gear 75 to rotate together with the second conveying member 69.

The third gear 74 is located above the swing gear 75. The third gear 74 is arranged away from, parallel to, the second gear 73. The third gear 74 is located closer, than the second gear 73, to the first conveying member 68. The third gear 74 receives a driving force of the motor 71 from the swing gear 75 to rotate.

The swing gear 75 is located above the first gear 72, below the second and third gears 73 and 74. The swing gear 75 stays in mesh with the first gear 72 all the time. The rotary shaft 751 of the swing gear 75 is rotatably supported inside an arcuate guide 78. The arcuate guide 78 is formed in an arcuate shape extending in the circumferential direction of the first gear 72. Thus, the swing gear 75 meshes with the first gear 72 to swing on its outer circumference along the arcuate guide 78. The swing gear 75, by swinging, selectively meshes with one of the second and third gears 73 and 74. The swing gear 75 transmits the driving force of the motor 71 received via the first gear 72 to one of the second and third gears 73 and 74.

The idle gear 76 is arranged between the third and fourth gears 74 and 77. The idle gear 76 is arranged between the third and fourth gears 74 and 77. The idle gear 76 transmits the driving force of the motor 71 received via the third gear 74 to the fourth gear 77.

The fourth gear 77 is fixed coaxially with the rotary shaft 681 of the first conveying member 68. The fourth gear 77 meshes with the idle gear 76. The rotary shaft 761 of the idle gear 76 is parallel to the rotary shaft of the second gear 73 (the rotary shaft 691 of the second conveying member 69). That is, the fourth gear 77 is a gear that has an axial angle $\alpha$ between the input shaft (the rotary shaft 761 of the idle gear 76) and the output shaft (the rotary shaft 681 of the first conveying member 68).

When the motor 71 is driven to rotate the first gear 72 clockwise in FIG. 13, the swing gear 75 receives the driving force from the first gear 72 to rotate, and moves, along the arcuate guide 78, on the outer circumference of the first gear 72 clockwise in FIG. 13. Thus, the swing gear 75 meshes with the third gear 74 to transmit the driving force of the motor 71 to the third gear 74. The driving force of the motor 71 that has been transmitted to the third gear 74 is transmitted to the fourth gear 77 via the idle gear 76. The first conveying member 68 is then rotated by the conveying driving portion 70 via the fourth gear 77 to convey the toner in the toner conveying direction f1. On the other hand, the second conveying member 69 stops rotating.

When the motor 71 is driven to rotate the first gear 72 counter-clockwise in FIG. 13, the swing gear 75 receives the driving force from the first gear 72 to rotate, and moves, along the arcuate guide 78, on the outer circumference of the first gear 72 counter-clockwise in FIG. 13. Thus, the swing gear 75 meshes with the second gear 73 to transmit the driving force of the motor 71 to the second gear 73. The second conveying member 69 is then rotated by the conveying driving portion 70 via the second gear 73 to convey the toner in the toner conveying direction f2. On the other hand, the first conveying member 68 stops rotating.

In this way, the conveying driving portion 70 rotates one of the first and second conveying members 68 and 69 selectively.

The loosening member 79A is arranged inside the supply pipe 63. The loosening member 79A is formed of a wire material made of metal such as stainless steel. The loosening member 79A is coupled with each of the first and second conveying members 68 and 69 and extends inward of the supply pipe 63. The loosening member 79A extends, for example, over the entire length of the supply pipe 63 in the up-down direction. The loosening member 79A is arranged so as to be reciprocatable in the extending direction (up-down direction) of the supply pipe 63.

With this structure, as the first and second conveying members 68 and 69 rotate, the loosening member 79A can be moved inside the supply pipe 63. Thus, it is possible, with a simple structure, to suppress attachment and agglomeration of toner to and on the inner wall surface in a single supply pipe 63 connected to the first and second conveying pipes 66 and 67.

First Embodiment

Figure 14:
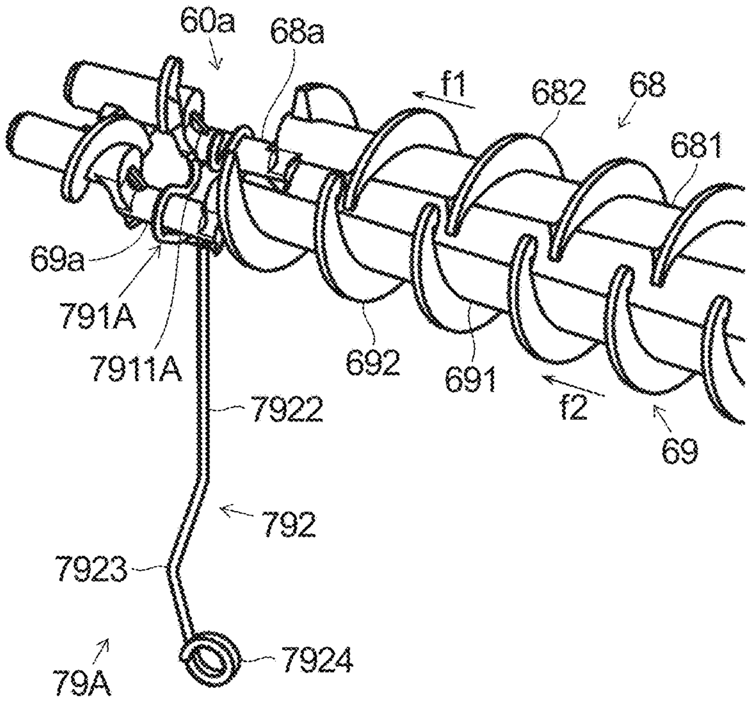
FIG. 14 is a partly enlarged perspective view of and around a loosening member in the toner supply device in FIG. 12.
Figure 15:
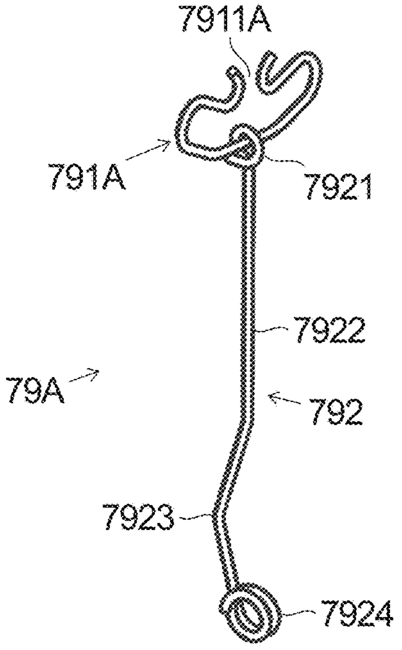
FIG. 15 is a perspective view of a loosening member according to a first embodiment shown in FIG. 14.

Next, the structure of a loosening member 79A according to a first embodiment will be described. FIG. 14 is a partly enlarged perspective view of and around the loosening member 79A in the toner supply device 60 in FIG. 12. FIG. 15 is a perspective view of the loosening member 79A according to the first embodiment shown in FIG. 14.

The first conveying member 68 includes a first crank portion 68*a* and the second conveying member 69 includes a second crank portion 69*a*. The first and second crank portions 68*a* and 69*a* are arranged in the confluence portion 60*a*. The first and second crank portions 68*a* and 69*a* are coupled with the loosening member 79A.

The first crank portion 68*a* projects in a direction intersecting the axial direction of the first conveying member 68. In other words, the first crank portion 68*a* projects from the axis of the rotary shaft 681 of the first conveying member 68 outward in the radial direction and is bent substantially in a U-shape as seen from a direction intersecting the axial direction. A central part of the first crank portion 68*a* in the axial direction is formed in a cylindrical shape extending in the axial direction.

The second crank portion 69*a* projects in a direction intersecting the axial direction of the second conveying member 69. In other words, the second crank portion 69*a* projects from the axial line of the rotary shaft 691 of the second conveying member 69 outward in the radial direction and is bent substantially in a U-shape as seen from a direction intersecting the axial direction. A central part of the second crank portion 69*a* in the axial direction is formed in a cylindrical shape extending in the axial direction.

The loosening member 79A is coupled with each of the first and second conveying members 68 and 69 in the confluence portion 60*a*. The loosening member 79A includes a coupling portion 791A and a loosening portion 792.

The coupling portion 791A is arranged above the loosening member 79A. The coupling portion 791A is located above a top end part of the supply pipe 63 and is arranged inside the confluence portion 60*a*. The coupling portion 791A is in a ring form as seen from the axial direction of the first and second conveying members 68 and 69. More specifically, the coupling portion 791A has an opening 7911A which, for example, is curved substantially in a C-shape, with its circumference partly missing. The opening 7911A is located above the coupling portion 791A. The opposite end parts of the wire material in the coupling portion 791A are curved further upward.

The coupling portion 791A is coupled with the first and second crank portions 68*a* and 69*a* so as to bridge them. In other words, the coupling portion 791A encloses the first and second crank portions 68*a* and 69*a*. The first and second crank portions 68*a* and 69*a* are coupled to inside the coupling portion 791A via the opening 7911A. With this structure, the loosening member 79A can be easily coupled with the first and second crank portions 68*a* and 69*a*.

The loosening portion 792 is arranged in a lower part of the loosening member 79A. The loosening portion 792 includes a connecting portion 7921, an extending portion 7922, and a bent portion 7923.

The connecting portion 7921 is located at a top end part of the loosening portion 792. The connecting portion 7921 is bent in a ring form as seen from a direction intersecting the axial direction of the first and second conveying members 68 and 69. A bottom part of the coupling portion 791A penetrates the connecting portion 7921. The loosening portion 792 is thereby connected to the coupling portion 791A.

The extending portion 7922 and the bent portion 7923 extend downward from the connecting portion 7921. That is, the loosening portion 792 extends inward of the supply pipe 63. The extending portion 7922 is continuous with the connecting portion 7921 and extends downward in a straight line along the extending direction of the supply pipe 63.

The bent portion 7923 is continuous with the extending portion 7922 and extends further downward. The bent portion 7923 is formed by being bent in the radial direction of the supply pipe 63 with respect to the extending portion 7922. The bent portion 7923 is bent, for example, substantially in a V-shape as seen from a direction intersecting the extending direction of the supply pipe 63.

At the lower end of the bent portion 7923, an annular portion 7924 is formed. The annular portion 7924 is bent, for example, in a ring form as seen from a direction intersecting the extending direction of the supply pipe 63. In this embodiment, the annular portion 7924 is formed, for example, in a two-turn ring form.

With this structure, as the first and second crank portions 68*a* and 69*a* rotate, the loosening member 79A can be reciprocated in the up-down direction inside the supply pipe 63. Thus, it is possible, with a simple structure, to suppress attachment and agglomeration of toner to and on the inner wall surface in a single supply pipe 63 connected to the first and second conveying pipes 66 and 67.

The loosening member 79A is designed to have a weight (the annular portion 7924) at its lower end located inside the supply pipe 63, and the weight's inertia is exploited to enhance the effect of suppressing attachment and agglomeration of toner to and on the inner wall face of the supply pipe 63.

Figure 16:
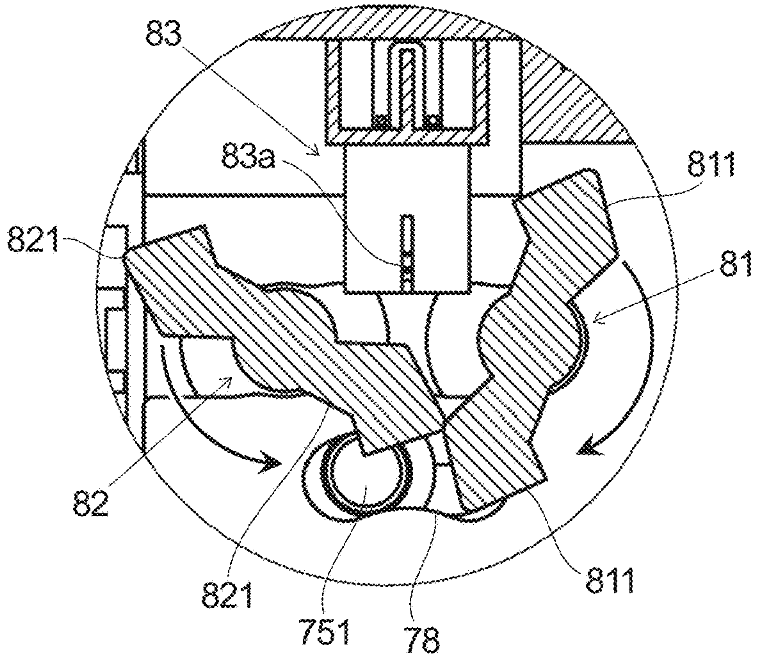
FIG. 16 is a sectional back view of a rotation sensing portion in the toner supply device in FIG. 10.
Figure 17:
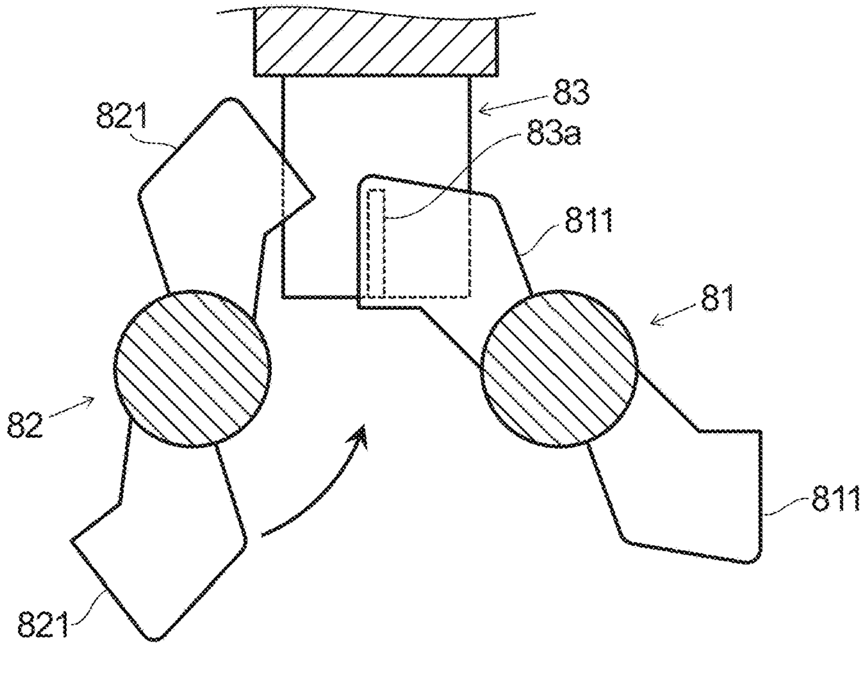
FIG. 17 is a diagram illustrating a state of rotation of first and second sensing shafts in FIG. 16.
Figure 18:
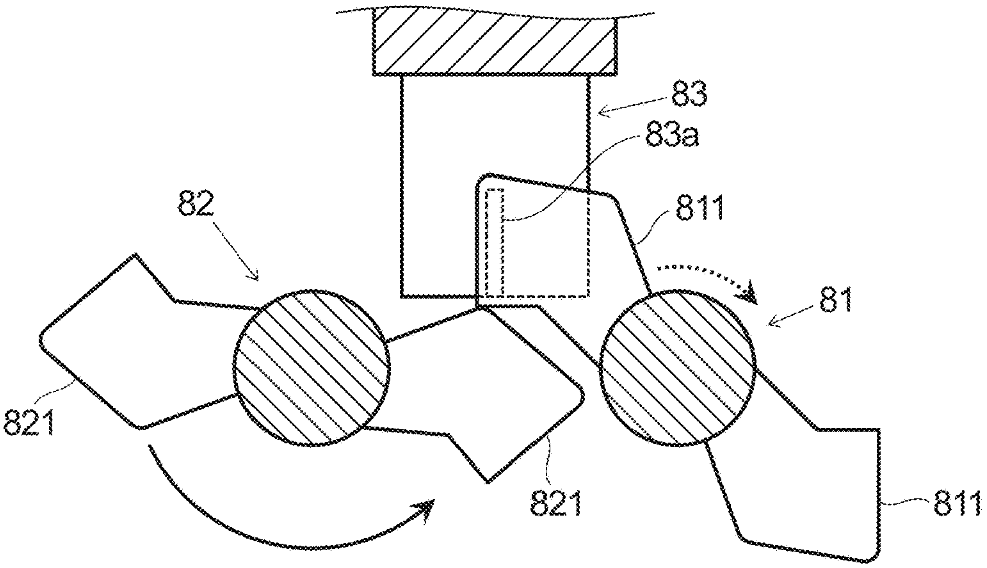
FIG. 18 is a diagram illustrating a state of rotation of the first and second sensing shafts in FIG. 16.
Figure 19:
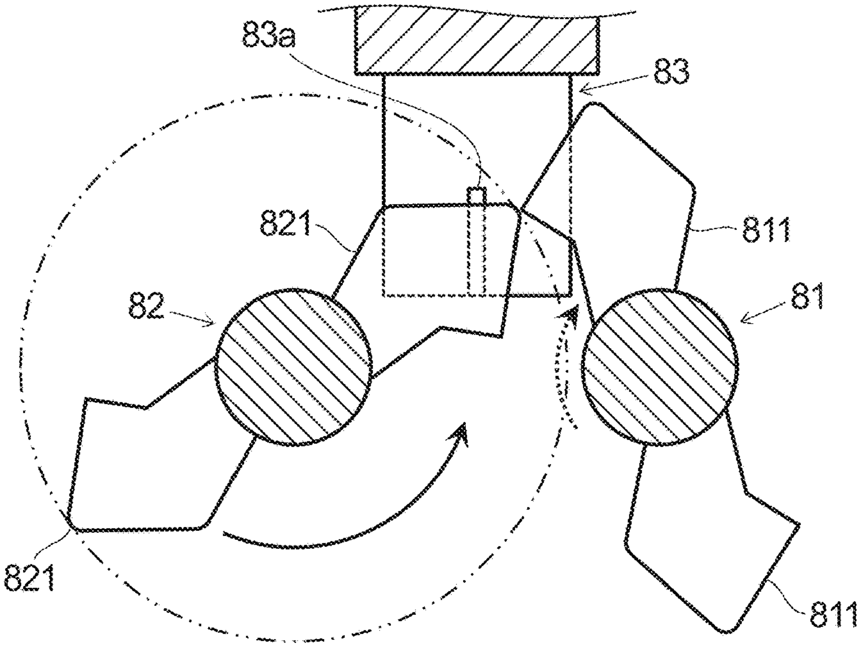
FIG. 19 is a diagram illustrating a state of rotation of the first and second sensing shafts in FIG. 16.

FIG. 16 is a sectional back view of the rotation sensing portion 80 in the toner supply device 60 in FIG. 10. FIGS. 17, 18, and 19 are diagrams illustrating different states of rotation of a first sensing shaft 81 and a second sensing shaft 82 in FIG. 16. The rotation sensing portion 80 is arranged in a rear part of the toner supply device 60, upstream of the second conveying pipe 67 in the toner conveying direction with respect to the conveying driving portion 70. The rotation sensing portion 80 includes a first sensing shaft 81, a second sensing shaft 82, and an optical sensor 83.

The first sensing shaft 81 is connected coaxially with, so as to extend, the rotary shaft 741 of the third gear 74 (see FIGS. 12 and 13). The first sensing shaft 81 is coupled to the first conveying member 68 via the third gear 74, the idle gear 76, and the fourth gear 77 and rotates together with the first conveying member 68. The first sensing shaft 81 rotates in the same direction and at the same speed as the first conveying member 68. The first sensing shaft 81 is, in this embodiment, located adjacent to the second sensing shaft 82 and extends parallel to the second sensing shaft 82.

The first sensing shaft 81 includes, for example, two first light-shielding plates 811. The two first light-shielding plates 811 extend outward in the radial direction on the first sensing shaft 81 and are arrayed at angular intervals of 180 degrees from each other in the circumferential direction. As the first sensing shaft 81 rotates, the first light-shielding plate 811 moves into and out of the optical path of the optical sensor 83.

The second sensing shaft 82 is connected coaxially with, so as to extend, the rotary shaft of the second gear 73 (see FIGS. 12 and 13). Here, the second gear 73 is fixed coaxially with the rotary shaft 691 of the second conveying member 69. That is, the second sensing shaft 82 is coupled to the second conveying member 69 and rotates together with the second conveying member 69. The second sensing shaft 82 rotates in the same direction and at the same speed as the second conveying member 69.

The second sensing shaft 82 includes, for example, two second light-shielding plates 821. The two second light-shielding plates 821 extend outward in the radial direction of the second sensing shaft 82 and are arrayed at angular intervals of 180 degrees from each other in the circumferential direction. As the second sensing shaft 82 rotates, the second light-shielding plate 821 moves into and out of the optical path of the optical sensor 83.

The optical sensor 83 is arranged above between the first and second sensing shafts 81 and 82. The rotation sensing portion 80 includes the single optical sensor 83. The optical sensor 83 is, for example, a transmission type sensor. It includes a light emitting portion and a light receiving portion (neither is shown) and has an optical path 83*a* passing from the light emitting portion to the light receiving portion. Here, the optical path 83*a* extends parallel to the axial direction of the first and second sensing shafts 81 and 82, in the depth direction with respect to the plane of FIG. 16. The optical sensor 83 senses whether the optical path 83*a* is blocked (light-shielded) or not blocked (light-transmitted).

The first light-shielding plate 811 on the first sensing shaft 81 and the second light-shielding plate 821 on the second sensing shaft 82 move into and out of the optical path 83*a* of the optical sensor 83. Thus, the optical sensor 83 senses the rotation of the first and second sensing shafts 81 and 82. That is, the optical sensor 83 senses the rotation of the second and third gears 73 and 74. The optical sensor 83 outputs to the control portion 8 a signal related to the sensed rotation of the second and third gears 73 and 74.

The control portion 8 receives the output signal of the optical sensor 83. The control portion 8 has a remaining quantity sensing portion 8*a* shown in FIG. 2. The function of the remaining quantity sensing portion 8*a* is achieved on a software basis by the CPU performing arithmetic operation in accordance with a program stored in the storage portion. The remaining quantity sensing portion 8*a* may be configured as an electrical hardware circuit.

The remaining quantity sensing portion 8*a*, based on the output signal of the optical sensor 83, senses the remaining quantity of toner in the first and second containers 51 and 52. More specifically, the remaining quantity sensing portion 8*a* counts the number of revolutions of the second and third gears 73 and 74 based on the output signal of the optical sensor 83 and, based on the number of revolutions, senses the remaining quantity of the toner in the first and second containers 51 and 52.

The remaining quantity sensing portion 8*a* counts the number of revolutions of the third gear 74 (the first conveying member 68) based on the output signal of the optical sensor 83 and, based on the number of revolutions, senses the toner in the first container 51 being empty. The control portion 8 controls the motor 71 to stop the rotation of the first conveying member 68 and thereby stops the supply of toner from the first container 51 to the developing device 40. Next, the control portion 8 rotates the motor 71 reversely to rotate the second gear 73 (the second conveying member 69) and thereby starts the supply of toner from the second container 52 to the developing device 40.

Similarly, the remaining quantity sensing portion 8*a* senses the toner in the second container 52 being empty based on the number of revolutions of the second gear 73 (second conveying member 69). Next, the control portion 8 controls the motor 71 to rotate the third gear 74 (the first conveying member 68) and thereby start the supply of toner from the first container 51 to the developing device 40.

According to the above construction, with the single optical sensor 83, it is possible to separately detect the rotation of the second gear 73 (the second conveying member 69) and the third gear 74 (the first conveying member 68). Thus, with a cost- and size-reduced construction, it is possible to accurately detect the remaining quantity of toner in the two containers (first and second containers 51 and 52) that supply toner to the single developing device 40.

For example, when the toner in the first container 51 runs out, as shown in FIG. 17, the first sensing shaft 81 may stop rotating. In FIG. 17, the first light-shielding plate 811 on the first sensing shaft 81 is in the optical path 83*a* of the optical sensor 83, blocking the optical path.

Next, the control portion 8 controls the motor 71 to start the rotation of the second conveying member 69 and thereby starts the supply of toner from the second container 52. Thus, the second sensing shaft 82 rotates together with the second conveying member 69. Then, as shown in FIG. 18, the second light-shielding plate 821 on the second sensing shaft 82 makes contact with the first light-shielding plate 811 in the optical path 83*a* of the optical sensor 83.

As the second sensing shaft 82 rotates further, as shown in FIG. 19, the second light-shielding plate 821 displaces the first light-shielding plate 811 to move it out of the optical path 83*a* of the optical sensor 83. The first light-shielding plate 811 moves out of the rotation region (inside the dash-dot-dot line circle in FIG. 19) of the second light-shielding plate 821, and is not sensed by the optical sensor 83.

Incidentally, in the image forming apparatus 1, when, for example, the toner in the second container 52 runs out, toner can be supplied from the first container 51 to the developing device 40. In a similar way as described above, when the second light-shielding plate 821 is in the optical path 83*a* of the optical sensor 83, the first light-shielding plate 811 makes contact with the second light-shielding plate 821 to move it out of the optical path 83*a* of the optical sensor 83.

In this way, one of the first and second light-shielding plates 811 and 821 rotates to make contact with the other, and thereby moves it out of the optical path 83*a* of the optical sensor 83. That is, one of the first and second light-shielding plates 811 and 821 forcibly rotates the other and thereby rotates one of the first and second conveying members 68 and 69 coupled to it.

Figure 20:
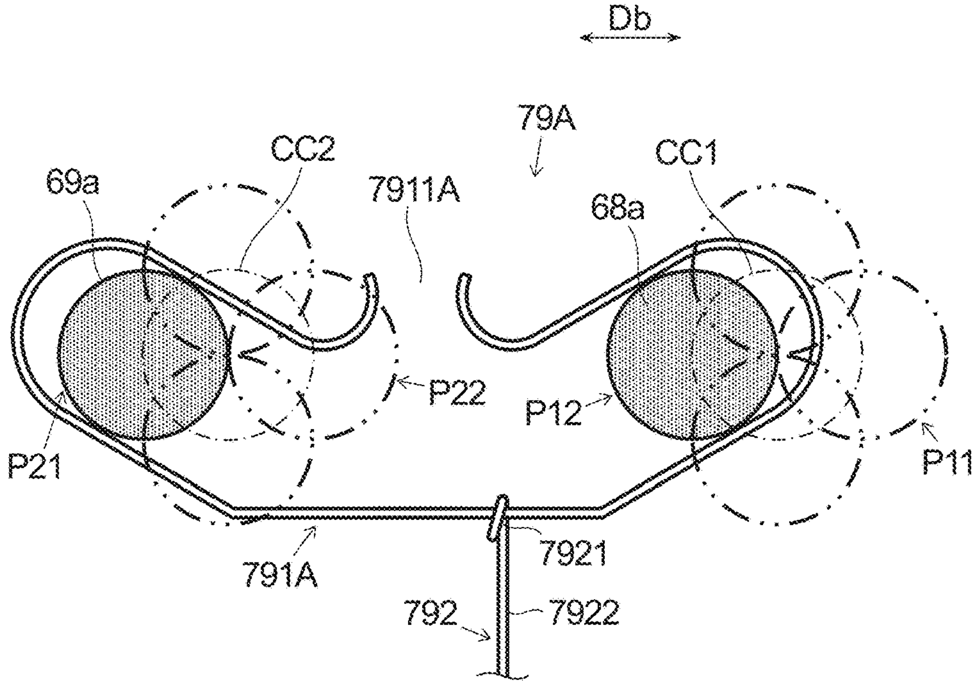
FIG. 20 is a part front view of the loosening member in FIG. 14.

FIG. 20 is a part front view of the loosening member 79A in FIG. 14. The coupling portion 791A of the loosening member 79A is coupled with the first and second crank portions 68*a* and 69*a*.

The center axis of the first crank portion 68*a* revolves along a locus CC1 as shown in FIG. 20. The dash-dot-dot lines intersecting the locus CC1 in FIG. 20 indicate the revolution of the first crank portion 68*a*. The first crank portion 68*a* is, at a position P11 on the locus CC1, farthest from the second crank portion 69*a* and is, at a position P12 on the locus CC1, closest to the second crank portion 69*a*.

The center axis of the second crank portion 69*a* revolves along a locus CC2 as shown in FIG. 20. The dash-dot-dot lines intersecting the locus CC2 in FIG. 20 indicate the revolution of the second crank portion 69*a*. The second crank portion 69*a* is, at a position P21 on the locus CC2, farthest from the first crank portion 68*a* and is, at a position P22 on the locus CC2, closest to the first crank portion 68*a*.

With respect to the first sensing shaft 81, when, as shown in FIG. 17, one of the first light-shielding plates 811 is located in the optical path 83*a*, the first crank portion 68*a* is arranged, for example, at the position P11 on the locus CC1. By contrast, when the other of the first light-shielding plates 811 is located in the optical path 83*a*, the first crank portion 68*a* is arranged, for example, at the position P12 on the locus CC1.

With respect to the second sensing shaft 82, when one of the second light-shielding plates 821 is located in the optical path 83*a*, the second crank portion 69*a* is arranged, for example, at the position P21 on the locus CC2. By contrast, when the other of the second light-shielding plate 821 is located in the optical path 83*a*, the second crank portion 69*a* is arranged, for example, at the position P22 on the locus CC2.

When the first crank portion 68*a* is at the position P11 and the second crank portion 69*a* is at the position P21, the first crank portion 68*a* is farthest from the second crank portion 69*a*. When the first crank portion 68*a* is at the position P12 and the second crank portion 69*a* is at the position P22, the first crank portion 68*a* is closest to the second crank portion 69*a*.

As described above, one of the first and second light-shielding plates 811 and 821 moves the other out of the optical path 83*a* and thereby rotates one of the first and second conveying members 68 and 69 coupled to it. That is, when the toner in the first container 51 runs out and the first conveying member 68 stops rotating and the second conveying member 69 starts rotating, the second light-shielding plate 821 moves the first light-shielding plate 811 out of the optical path 83*a* and thereby moves the first crank portion 68*a* away from the position P11 or P12. Likewise, when the toner in the second container 52 runs out and the second conveying member 69 stops rotating and then the first conveying member 68 starts rotating, the first light-shielding plate 811 moves the second light-shielding plate 821 out of the optical path 83*a* and thereby moves the second crank portion 69*a* away from the position P21 or P22.

Here, when the first crank portion 68*a* is farthest from the second crank portion 69*a*, the first and second conveying members 68 and 69 are restrained by the coupling portion 791A of the loosening member 79A and this makes it difficult for them to rotate. On the other hand, when the first crank portion 68*a* is closest to the second crank portion 69*a*, the coupling portion 791A is so loose that the coupling portion 791A is more likely to come off the first and second crank portions 68*a* and 69*a*. In these states, trouble such as abnormal noise is also likely.

By contrast, with the above-described structure according to the embodiment, one of the first and second light-shielding plates 811 and 821 moves the other out of the optical path 83*a* to keep the distance between the first and second crank portions 68*a* and 69*b* smaller than that when they are farthest from each other but larger than that when they are closest to each other. With this structure, it is possible to avoid a state where the first and second crank portions 68*a* and 69*b* are farthest from or closest to each other. This makes it possible to smoothly rotate the first and second conveying members 68 and 69 and to keep the first and second crank portions 68*a* and 69*a* coupled with the loosening member 79A; it is thus possible to suppress abnormal noise.

Second Embodiment

Figure 21:
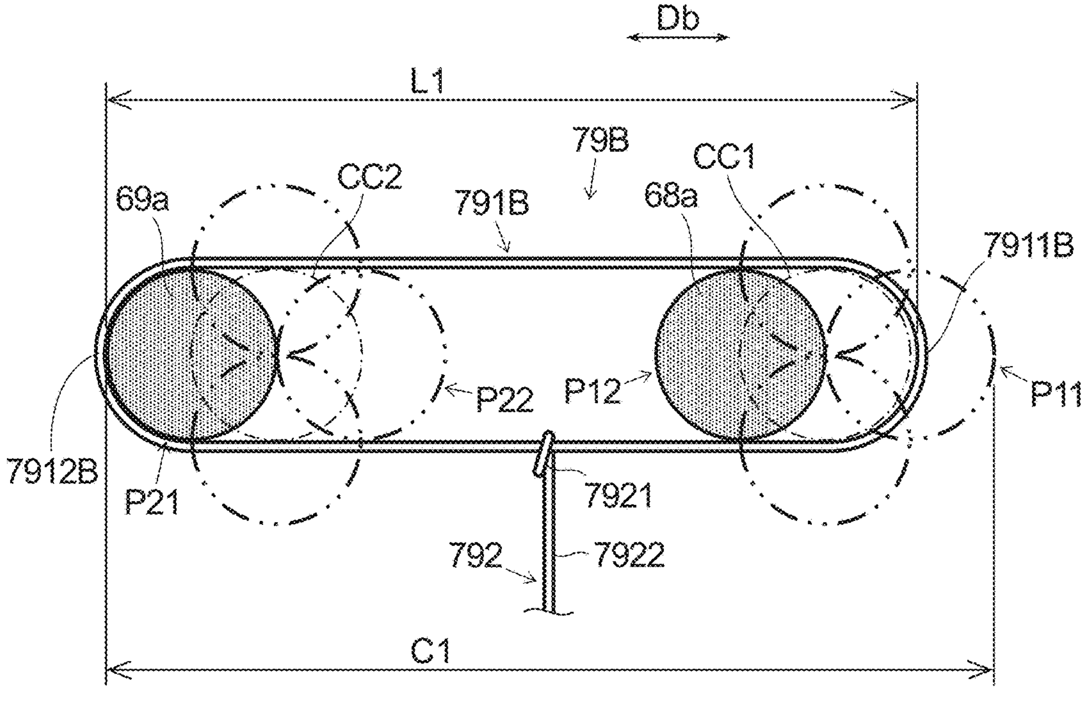
FIG. 21 is a part front view of a loosening member according to a second embodiment.
Figure 22:
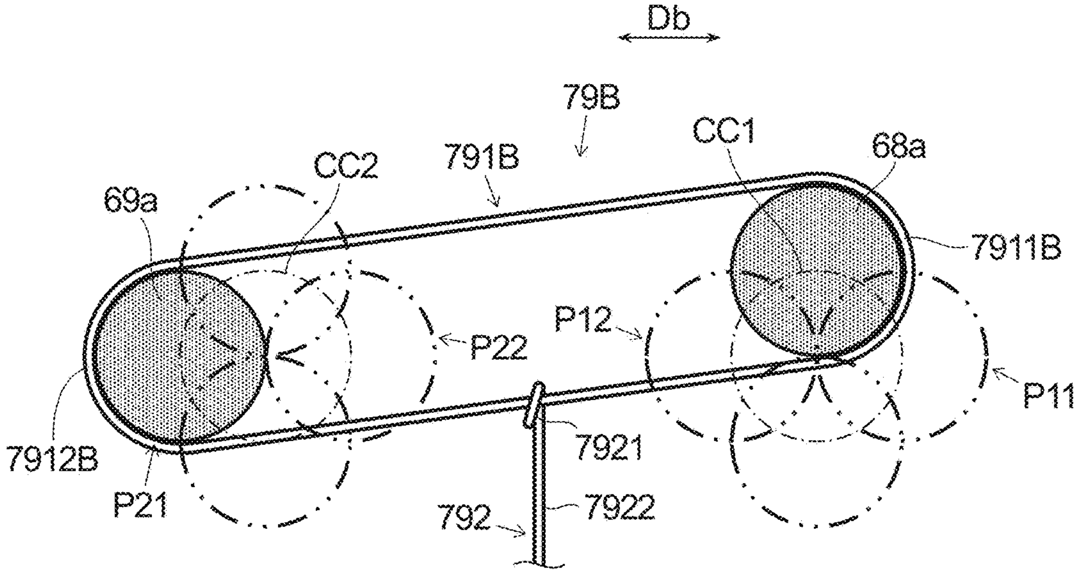
FIG. 22 is a part front view of the loosening member in FIG. 21 in a displaced state.

Next, the structure of a loosening member 79B according to a second embodiment will be described. FIG. 21 is a part front view of the loosening member 79B according to the second embodiment. FIG. 22 is a part front view of the loosening member 79B in FIG. 21 in a displaced state. The structure of the second embodiment is basically the same as that of the first embodiment described previously; accordingly, such elements as are common to the two embodiments are assigned the same reference signs as used previously and their description may be omitted.

The loosening member 79B of the second embodiment includes a coupling portion 791B and a loosening portion 792. The coupling portion 791B is formed, for example, in an elongate-circular shape or in an oval shape as seen from the axial direction of the first and second conveying members 68 and 69. The coupling portion 791B encloses the first and second crank portions 68*a* and 69*a*. That is, the coupling portion 791B is coupled with the first and second crank portions 68*a* and 69*a* so as to bridge them.

The coupling portion 791B has a first outside contact portion 7911B and a second outside contact portion 7912B. The first and second outside contact portions 7911B and 7912B are arranged in opposite end parts of the coupling portion 791B in the array direction (in the left-right, transverse, direction in FIG. 21) Db in which the first and second conveying members 68 and 69 are arrayed. The first and second outside contact portions 7911B and 7912B make contact with the circumferential faces of the first and second crank portions 68*a* and 69*b* respectively from outward in the array direction Db.

In FIG. 21, "L1" indicates the dimension in the array direction Db between the first and second outside contact portions 7911B and 7912B, and "C1" indicates the distance, when the first and second crank portions 68*a* and 69*a* are at the position P11 on the locus CC1 and at the position P21 on the locus CC2 respectively, between respective outer circumferential parts of the first and second crank portions 68*a* and 69*a* that are farthest from each other in the array direction Db. That is, the dimension L1 between the first and second outside contact portions 7911B and 7912B in the array direction Db is smaller than the distance C1, in a state where the first and second crank portions 68*a* and 69*a* are farthest from each other, between respective outer circumferential parts of the first and second crank portions 68*a* and 69*a* that are farthest from each other in the array direction Db.

With the structure described above, when the first and second crank portions 68*a* and 69*a* stop in a state where they are farthest from each other, owing to the elastic force of the coupling portion 791B, as shown in FIG. 22, one of them are moved inward, in the array direction Db, from the position P11 on the locus CC1 or from the position P21 on the locus CC2. Thus, it is possible to avoid a state where the first and second crank portions 68*a* and 69*b* are farthest from each other. As a result, it is possible to avoid restrained or loose coupling of the coupling portion 791B with the first and second conveying members 68 and 69; thus, the first and second conveying members 68 and 69 can rotate smoothly.

Third Embodiment

Figure 23:
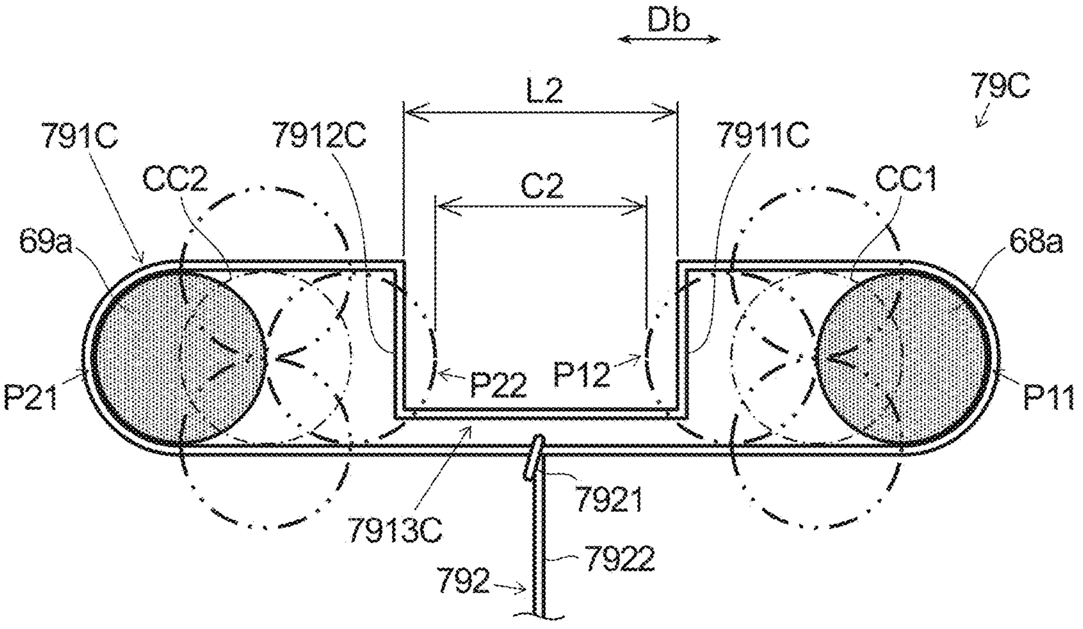
FIG. 23 is a part front view of a loosening member according to a third embodiment.

Next, the structure of a loosening member 79C according to a third embodiment will be described. FIG. 23 is a part front view of the loosening member 79C according to the third embodiment. The structure of the third embodiment is basically the same as that of the embodiments described previously; accordingly, such elements as are common to these embodiments are assigned the same reference signs as used previously and their description may be omitted.

The loosening member 79C of the third embodiment includes a coupling portion 791C and a loosening portion 792. The coupling portion 791C is formed, for example, to have an outline substantially in an elongate-circular shape or in an oval shape as seen from the axial direction of first and second conveying members 68 and 69. Furthermore, the coupling portion 791C has a depressed portion 7913C with a middle part of it in the array direction Db along which the first and second conveying members 68 and 69 are arrayed depressed downward. The coupling portion 791C, outside the depressed portion 7913C, encloses the first and second crank portions 68*a* and 69*a*. That is, the coupling portion 791C is coupled with the first and second crank portions 68*a* and 69*a* so as to bridge them.

The coupling portion 791C has a first inside contact portion 7911C and a second inside contact portion 7912C. The first and second inside contact portions 7911C and 7912C are arranged in opposite end parts of the depressed portion 7913C in the array direction Db. The first and second inside contact portions 7911C and 7912C make contact with the circumferential faces of the first and second crank portions 68*a* and 69*b* respectively from inward in the array direction Db.

In FIG. 23, "L2" indicates the dimension in the array direction Db between the first and second inside contact portions 7911C and 7912C, and "C2" indicates the distance, when the first and second crank portions 68*a* and 69*a* are at the position P12 on the locus CC1 and at the position P22 on the locus CC2 respectively, between respective outer circumferential parts of the first and second crank portions 68*a* and 69*a* that are closest to each other in the array direction Db. That is, the dimension L2 between the first and second inside contact portions 7911C and 7912C in the array direction Db is larger than the distance C2, in a state where the first and second crank portions 68*a* and 69*a* are closest to each other, between respective outer circumferential parts of the first and second crank portions 68*a* and 69*a* that are closest to each other in the array direction Db.

With the structure described above, when the first and second crank portions 68*a* and 69*a* stop in a state where they are closest to each other, owing to the elastic force of the coupling portion 791C, one of them are moved, in the array direction Db, outward from the position P12 on the locus CC1 or the position P22 on the locus CC2. That is, it is possible to avoid a state where the first and second crank portions 68*a* and 69*b* are closest to each other. As a result, it is possible to avoid restrained or loose coupling of the coupling portion 791C with the first and second conveying members 68 and 69, and this permits smooth rotation of the first and second conveying members 68 and 69.

Fourth Embodiment

Figure 24:
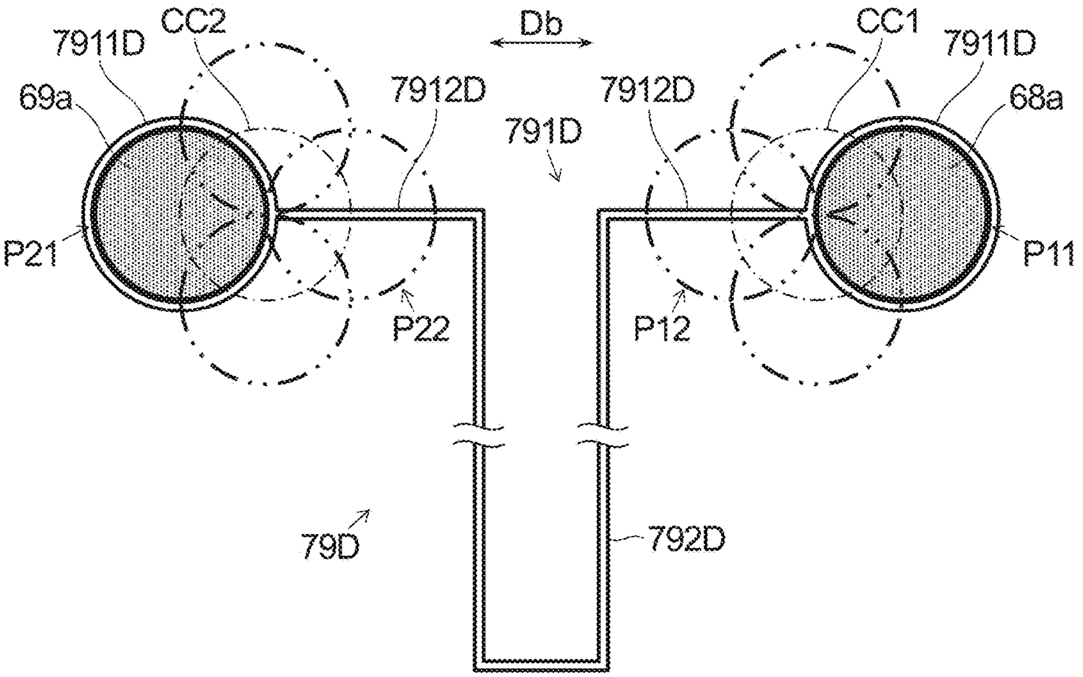
FIG. 24 is a front view of a loosening member according to a fourth embodiment.

Next, the structure of a loosening member 79D according to a fourth embodiment will be described. FIG. 24 is a front view of the loosening member 79D according to the fourth embodiment. The structure of the fourth embodiment is basically the same as that of the embodiments described previously; accordingly, such elements as are common to these embodiments are assigned the same reference signs as used previously and their description may be omitted.

The loosening member 79D of the fourth embodiment includes a coupling portion 791D and a loosening portion 792D. The coupling portion 791D has two circular portions 7911D and two straight portions 7912D.

The two circular portions 7911D are formed substantially in a circular shape as seen from the axial direction of the first and second conveying members 68 and 69. The two circular portions 7911D encloses the first and second crank portions 68*a* and 69*a* respectively and are adjacent to their outer circumferential parts over the entire region in a circumferential direction.

The two straight portions 7912D are respectively connected to the two circular portions 7911D from inward in the array direction Db along which the first and second conveying members 68 and 69 are arrayed. The two straight portions 7912D extend from their parts connected to the two circular portions 7911D inward in the array direction Db. The two straight portions 7912D are arranged on a straight line.

The loosening portion 792D is arranged in a middle part of the loosening member 79D in the array direction Db. The loosening portion 792D is connected to middle-side end parts of the two straight portions 7912D in the array direction Db. The loosening portion 792D projects downward with respect to the two straight portions 7912D and is formed substantially in a U shape as seen from the axial direction of the first and second conveying members 68 and 69. The loosening portion 792D extends inward of the supply pipe 63.

With the structure described above, owing to the elastic force of the loosening portion 792D substantially in a U shape, it is possible to avoid a state where the first and second crank portions 68*a* and 69*b* are farthest from or closest to each other. This makes it possible to smoothly rotate the first and second conveying members 68 and 69 and to keep the first and second crank portions 68*a* and 69*a* coupled with the loosening member 79D; it is thus possible to suppress abnormal noise.

The description given above of embodiments of the present disclosure is in no way meant to limit the scope of the present disclosure; the present disclosure can be implemented with any modifications made without departing from the sense of the present disclosure.

For example, while in the embodiment described above, the image forming apparatus 1 is assumed to be a color-printing image forming apparatus of what is called a tandem type in which images of a plurality of colors are formed so as to be sequentially superposed on each other, this is not meant as any limitation to that and similar types. The image forming apparatus may be a color-printing image forming apparatus of any type other than a tandem type, or may be an image forming apparatus for monochrome printing.

What is claimed is:

1. A toner supply device for supplying toner in first and second containers to a developing device, comprising:
- a single supply pipe connected to the developing device, the toner flowing into the developing device via the single supply pipe;
- a first conveying pipe connected between the first container and the supply pipe, the toner being conveyed from the first container toward the supply pipe via the first conveying pipe;
- a second conveying pipe connected between the second container and the supply pipe, the toner being conveyed from the second container toward the supply pipe via the second conveying pipe;
- a first conveying member arranged rotatably in the first conveying pipe, the first conveying member conveying the toner from the first container toward the supply pipe;
- a second conveying member arranged rotatably in the second conveying pipe, the second conveying member conveying the toner from the second container toward the supply pipe; and
- a loosening member arranged in the supply pipe reciprocatably in an extending direction of the supply pipe, wherein
- the first and second conveying pipes are arranged side by side in a direction intersecting extending directions thereof so as to join together at a confluence portion to which the supply pipe is connected,
- the loosening member is coupled with each of the first and second conveying members at the confluence portion and extends inward of the supply pipe,
- the first conveying member has a first crank portion which projects in a direction intersecting an axial direction of the first conveying member and with which the loosening member is coupled,
- the second conveying member has a second crank portion which projects in a direction intersecting an axial direction of the second conveying member and with which the loosening member is coupled,
- the loosening member includes
  - a coupling portion coupled with the first and second crank portions so as to bridge them, and
  - a loosening portion connected to the coupling portion and extending toward the supply pipe,
- the coupling portion has an opening with a circumference thereof partly missing, and
- the first and second crank portions are coupled to inside the coupling portion via the opening.

2. The toner supply device according to claim 1, wherein
- the coupling portion includes a first inside contact portion and a second inside contact portion that make contact with circumferential faces of the first and second crank portions respectively from inward in an array direction along which the first and second conveying members are arrayed, and
- a dimension between the first and second inside contact portions in the array direction is larger than a distance, in a state where the first and second crank portions are closest to each other, between respective outer circumferential parts of the first and second crank portions that are closest to each other in the array direction.

3. An image forming apparatus comprising:
- the developing device for supplying toner to an image carrying member;
- the first and second containers for storing the toner to be supplied to the developing device; and
- the toner supply device according to claim 1 for supplying the toner in the first and second containers to the developing device.

4. A toner supply device for supplying toner in first and second containers to a developing device, comprising:
- a single supply pipe connected to the developing device, the toner flowing into the developing device via the single supply pipe;
- a first conveying pipe connected between the first container and the supply pipe, the toner being conveyed from the first container toward the supply pipe via the first conveying pipe;

a second conveying pipe connected between the second container and the supply pipe, the toner being conveyed from the second container toward the supply pipe via the second conveying pipe;

a first conveying member arranged rotatably in the first conveying pipe, the first convening member conveying the toner from the first container toward the supply pipe;

a second conveying member arranged rotatably in the second conveying pipe, the second conveying member conveying the toner from the second container toward the supply pipe; and a loosening member arranged in the supply pipe reciprocatably in an extending direction of the supply pipe, wherein the first and second conveying pipes are arranged side by side in a direction intersecting extending directions thereof so as to join together at a confluence portion to which the supply pipe is connected, the loosening member is coupled with each of the first and second conveying members at the confluence portion and extends inward of the supply pipe, the first conveying member has a first crank portion which projects in a direction intersecting an axial direction of the first conveying member and with which the loosening member is coupled, the second conveying member has a second crank portion which projects in a direction intersecting an axial direction of the second conveying member and with which the loosening member is coupled, the loosening member includes a coupling portion coupled with the first and second crank portions so as to bridge them, and a loosening portion connected to the coupling portion and extending toward the supply pipe the coupling portion includes a first outside contact portion and a second outside contact portion that make contact with circumferential faces of the first and second crank portions respectively from outward in an array direction along which the first and second conveying members are arrayed, and a dimension between the first and second outside contact portions in the array direction is smaller than a distance, in a state where the first and second crank portions are farthest from each other, between respective outer circumferential parts of the first and second crank portions that are farthest from each other in the array direction.

5. A toner supply device for supplying toner in first and second containers to a developing device, comprising:

a single supply pipe connected to the developing device, the toner flowing into the developing device via the single supply pipe;

a first conveying pipe connected between the first container and the supply pipe, the toner being conveyed from the first container toward the supply pipe via the first conveying pipe;

a second conveying pipe connected between the second container and the supply pipe, the toner being conveyed from the second container toward the supply pipe via the second conveying pipe;

a first conveying member arranged rotatably in the first conveying pipe, the first conveying member conveying the toner from the first container toward the supply pipe;

a second conveying member arranged rotatably in the second conveying pipe, the second conveying member conveying the toner from the second container toward the supply pipe; and a loosening member arranged in the supply pipe reciprocatably in an extending direction of the supply pipe, wherein the first and second conveying pipes are arranged side by side in a direction intersecting extending directions thereof so as to join together at a confluence portion to which the supply pipe is connected, the loosening member is coupled with each of the first and second conveying members at the confluence portion and extends inward of the supply pipe, the first conveying member has a first crank portion which projects in a direction intersecting an axial direction of the first conveying member and with which the loosening member is coupled, the second conveying member has a second crank portion which projects in a direction intersecting an axial direction of the second conveying member and with which the loosening member is coupled, the loosening member includes a coupling portion coupled with the first and second crank portions so as to bridge them, and a loosening portion connected to the coupling portion and extending toward the supply pipe, the toner supply device further includes a first sensing shaft coupled to the first conveying member to rotate together with the first conveying member;

a second sensing shaft coupled to the second conveying member to rotate together with the second conveying member;

a single optical sensor for sensing rotation of the first and second sensing shafts; and a remaining quantity sensing portion that counts a number of revolutions of the first and second sensing shafts based on an output signal of the optical sensor to sense a remaining quantity of toner in the first and second containers based on the number of revolutions, wherein the first sensing shaft includes a first light-shielding plate that moves into and out of an optical path of the optical sensor, the second sensing shaft includes a second light-shielding plate that moves into and out of the optical path of the optical sensor, and one of the first and second light-shielding plates by rotating to make contact with another, moves the other out of the optical path of the optical sensor, rotates one of the first and second conveying members coupled to the other, keeps a distance between the first and second crank portions smaller than a distance therebetween when the first and second crank portions are farthest from each other but larger than a distance therebetween when the first and second crank portions are closest to each other.

* * * * *